US011747265B2

(12) United States Patent
Wardle et al.

(10) Patent No.: US 11,747,265 B2
(45) Date of Patent: Sep. 5, 2023

(54) STRUCTURAL ELECTRONICS WIRELESS SENSOR NODES

(71) Applicants: Analog Devices, Inc., Wilmington, MA (US); Massachusetts Institute of Technology, Cambridge, MA (US)

(72) Inventors: Brian L. Wardle, Lexington, MA (US); Yosef Stein, Sharon, MA (US); Estelle Cohen, Chestnut Hill, MA (US); Michael Murray, Windham, NH (US)

(73) Assignees: Analog Devices, Inc., Wilmington, MA (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/690,596

(22) Filed: Mar. 9, 2022

(65) Prior Publication Data
US 2022/0196542 A1    Jun. 23, 2022

Related U.S. Application Data

(63) Continuation of application No. 16/900,159, filed on Jun. 12, 2020, which is a continuation-in-part of (Continued)

(51) Int. Cl.
*G01N 27/04* (2006.01)
*G01N 27/22* (2006.01)
*G01N 17/04* (2006.01)

(52) U.S. Cl.
CPC .......... *G01N 17/04* (2013.01); *G01N 27/04* (2013.01); *G01N 27/22* (2013.01)

(58) Field of Classification Search
CPC ...... G01N 17/04; G01N 27/04; G01N 27/127; G01N 27/22
See application file for complete search history.

(56) References Cited

U.S. PATENT DOCUMENTS 6,803,260 B2    10/2004    Shin et al.
7,730,547 B2 *    6/2010    Barrera ................. G01L 1/2287
                                                    250/306
(Continued)

FOREIGN PATENT DOCUMENTS

WO    WO 2007/136755 A2    11/2007
WO    WO 2008/054541 A2    5/2008
(Continued)

OTHER PUBLICATIONS

Amanda L. Tiano, et al. "Boron nitride nanotube: synthesis and applications," Proc. SPIE 9060, Nanosensors, Biosensors, and Info-Tech Sensors and Systems 2014, 906006 (Apr. 16, 2014); https://doi.org/10.1117/12.2045396 (Year: 2014).*
(Continued)

*Primary Examiner* — Natalie Huls
(74) *Attorney, Agent, or Firm* — Wolf, Greenfield & Sacks, P.C.

(57) ABSTRACT

A structural electronics wireless sensor node is provided that includes layers of electronic components fabricated from patterned nanostructures embedded in an electrically conductive matrix. In some aspects, the structural electronics wireless sensor node includes a plurality of nanostructure layers that each form individual electronic components of the structural electronics wireless sensor node. In certain embodiments, the structural electronics wireless sensor node includes electronic components such as a resistor, a inductor, a capacitor, and/or an antenna.

11 Claims, 28 Drawing Sheets

Related U.S. Application Data application No. PCT/US2018/065422, filed on Dec. 13, 2018.

(60) Provisional application No. 62/598,425, filed on Dec. 13, 2017, provisional application No. 62/598,430, filed on Dec. 13, 2017, provisional application No. 62/598,428, filed on Dec. 13, 2017, provisional application No. 62/598,416, filed on Dec. 13, 2017.

(56) References Cited

U.S. PATENT DOCUMENTS

| | | |
|---|---|---|
| 8,337,979 B2 | 12/2012 | Wardle et al. |
| 10,502,676 B2 * | 12/2019 | Kessler .................. G01N 17/04 |
| 2007/0138010 A1 * | 6/2007 | Ajayan .................. G01L 1/005 |
| | | 427/112 |
| 2011/0142091 A1 * | 6/2011 | Wardle .................. G01N 25/72 |
| | | 977/773 |
| 2014/0360661 A1 | 12/2014 | Kabir et al. |
| 2016/0050757 A1 * | 2/2016 | Diao ...................... H05K 1/162 |
| | | 336/200 |
| 2017/0358854 A1 | 12/2017 | Stein |
| 2020/0247562 A1 | 8/2020 | Stein |
| 2020/0309674 A1 | 10/2020 | Wardle et al. |
| 2020/0386703 A1 * | 12/2020 | Shevate ............... G01N 27/121 |

FOREIGN PATENT DOCUMENTS

| | | |
|---|---|---|
| WO | WO 2009/029218 A2 | 3/2009 |
| WO | WO 2010/120273 A2 | 10/2010 |
| WO | WO 2011/014258 A2 | 2/2011 |
| WO | WO 2011/066288 A2 | 6/2011 |
| WO | WO 2011/094347 A2 | 8/2011 |
| WO | WO 2012/075282 A2 | 6/2012 |
| WO | WO 2012/091789 A1 | 7/2012 |
| WO | WO 2013/044053 A1 | 3/2013 |
| WO | WO 2015/199785 A2 | 12/2015 |
| WO | WO 2017/173032 A1 | 10/2017 |
| WO | WO 2017/210238 A1 | 12/2017 |
| WO | WO 2018/231925 A1 | 12/2018 |
| WO | WO 2019/055155 A1 | 3/2019 |
| WO | WO 2019/108616 A1 | 6/2019 |
| WO | WO 2019/118706 A1 | 6/2019 |
| WO | WO 2020/123974 A1 | 6/2020 |
| WO | WO 2020/124018 A1 | 6/2020 |
| WO | WO 2020/236508 A1 | 11/2020 |

OTHER PUBLICATIONS

International Search Report and Written Opinion dated May 6, 2019 in connection with International Application No. PCT/US2018/065422.

International Preliminary Report on Patentability dated Jun. 25, 2020 in connection with International Application No. PCT/US2018/065422.

[No Author Listed], Modulus of elasticity and Poisson's coefficient of polymeric materials. Sonelastic, Advanced Impulse Excitation Technique. 2022. https://www.sonelastic.com/en/fundamentals/tables-of-materials-properties/polymers.html. [last accessed Nov. 28, 2022.], 1 page.

[No Author Listed], Sonelastic Systems Catalog. ATCP Physical Engineering, Sonilastic Division. Nov. 2022. 16 pages.

* cited by examiner

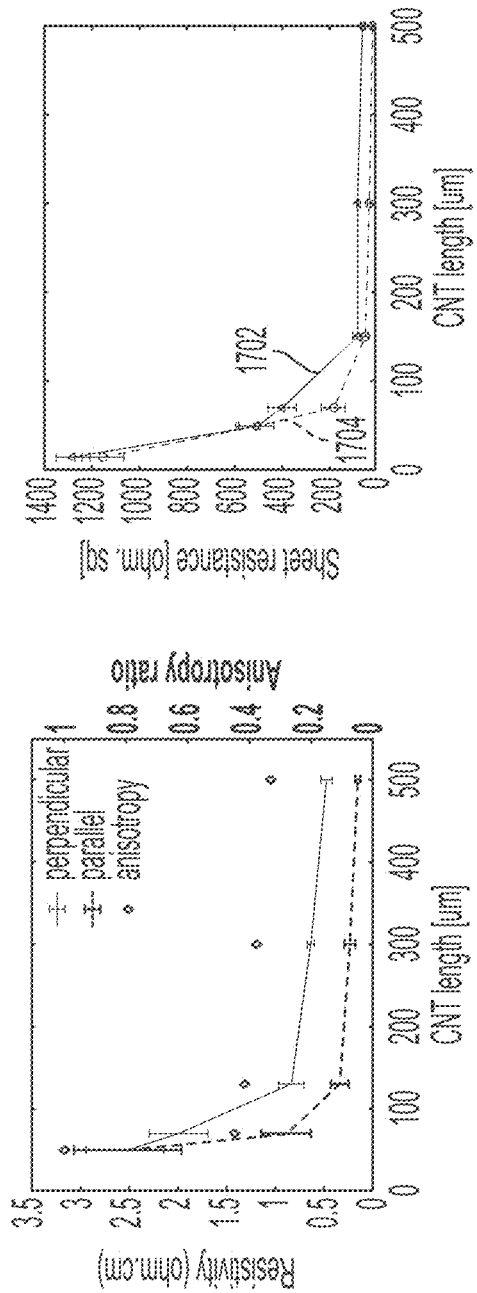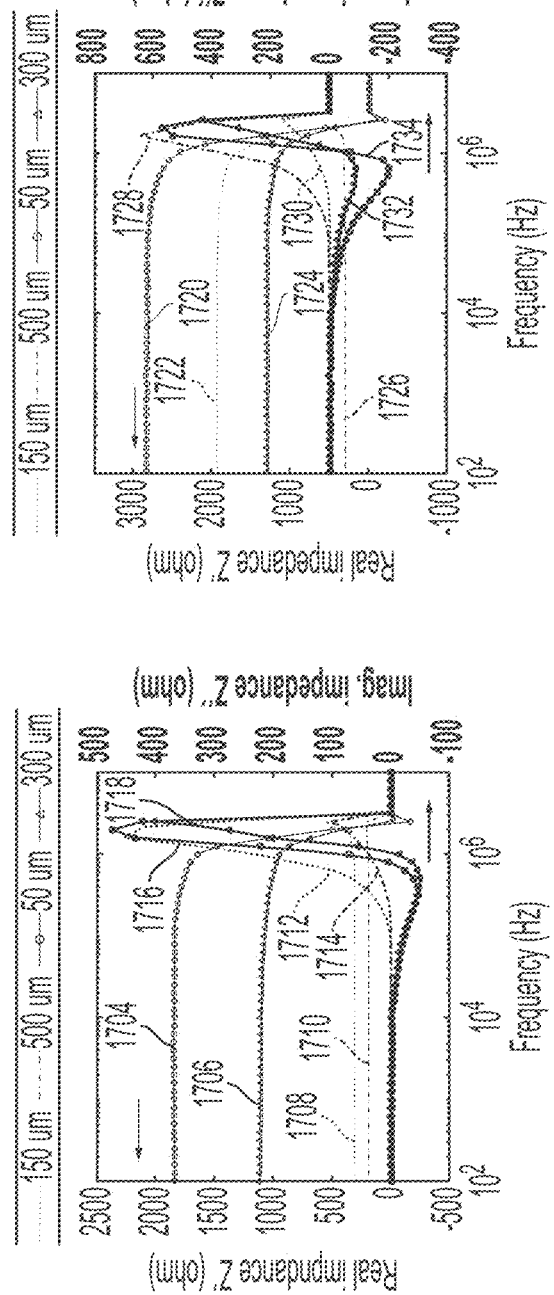
FIG. 17A
FIG. 17B
FIG. 17C
FIG. 17D

STRUCTURAL ELECTRONICS WIRELESS SENSOR NODES

CROSS-REFERENCE TO RELATED APPLICATIONS

This application is a Continuation claiming the benefit of U.S. application Ser. No. 16/900,159, filed Jun. 12, 2020, and entitled "STRUCTURAL ELECTRONICS WIRELESS SENSOR NODES," which is hereby incorporated by reference herein in its entirety.

U.S. application Ser. No. 16/900,159 claims the benefit as a Continuation-in-part of International Patent Application Serial No. PCT/US2018/065422, filed Dec. 13, 2018, and entitled "STRUCTURAL ELECTRONICS WIRELESS SENSOR NODES," which is hereby incorporated herein by reference in its entirety.

Application PCT/US2018/065422 claims the benefit under 35 U.S.C. § 119(e) of U.S. Provisional Application No. 62/598,416, filed Dec. 13, 2017, and entitled "Resistor, Inductor, and Capacitor Structural Electronics Elements," which is hereby incorporated herein by reference in its entirety.

Application PCT/US2018/065422 claims the benefit under 35 U.S.C. 119(e) of U.S. Provisional Application No. 62/598,425, filed Dec. 13, 2017, and entitled "Flexible Patch Antenna," which is hereby incorporated herein by reference in its entirety.

Application PCT/US2018/065422 claims the benefit under 35 U.S.C. § 119(e) of U.S. Provisional Application No. 62/598,428, filed Dec. 13, 2017, and entitled "Structural Electronics Passive Wireless Sensor Nodes," which is hereby incorporated herein by reference in its entirety.

Application PCT/US2018/065422 claims the benefit under 35 U.S.C. § 119(e) of U.S. Provisional Application No. 62/598,430, filed Dec. 13, 2017, and entitled "Advanced Manufacturing Structural Electronics," which is hereby incorporated herein by reference in its entirety.

FIELD OF THE DISCLOSURE

The present disclosure relates generally to wireless sensor nodes that include components fabricated from patterned nanostructures.

BACKGROUND

Sensor systems are sometimes used for sensing various environmental and other state conditions. Conventional sensor systems may include a transceiver that can be used to communicate with an external device. In such cases, the sensor systems use an external or internal energy source (e.g., a battery-powered energy source) to operate the transceiver and/or other components of the sensor system. Inclusion of the transceiver and/or internal energy source oftentimes results in bulky sensor systems that consumes high power, usually in the range of 1-10 milliwatts. Such systems cannot be readily deployed at certain sites and/or locations where smaller packaging is desirable.

SUMMARY OF THE DISCLOSURE

Structural electronics wireless sensor nodes that include components fabricated from patterned nanostructures are generally described.

In some embodiments, a structural electronics wireless sensor node is described, wherein the structural electronics wireless sensor node comprises a first nanostructure layer comprising a first plurality of patterned nanostructures embedded in an electrically insulating matrix, wherein the first nanostructure layer serves a first electronic function of the wireless sensor node. In some embodiments, the structural electronics wireless sensor node comprises at least a second nanostructure layer of the body comprising a second plurality of patterned nanostructures embedded in an electrically insulating matrix, wherein the second nanostructure layer serves a second electronic function of the wireless sensor node. In certain embodiments, the first nanostructure layer is electrically coupled to the second nanostructure layer.

According to some embodiments, a structural electronics wireless sensor node comprises a plurality of nanostructure layers, each layer comprising respective pluralities of patterned nanostructures embedded in an electrically insulating matrix, wherein each layer serves a different electronic function of the wireless sensor node and the layers are electrically coupled by an electrical connection.

According to certain embodiments, a method of fabricating a structural electronics wireless sensor node is described, wherein the structural electronics wireless sensor node comprises a plurality of nanostructure layers. In some embodiments, the method comprises sputtering a solution of nanostructures on a substrate, providing an electrically insulating material, embedding the forest of parallel patterned nanostructures in the electrically insulating material, thereby providing a first nanostructure layer comprising parallel patterned nanostructures embedded in an electrically insulating matrix, electrically coupling the first nanostructure layer to at least a second nanostructure layer comprising parallel patterned nanostructures embedded in an electrically insulating matrix, and integrating the structural wireless sensor node into a manufactured product.

In some embodiments, a structural electronics wireless sensor node is described, wherein the structural electronics wireless sensor node comprises a first nanostructure layer comprising a first plurality of patterned nanostructures embedded in an electrically insulating matrix, wherein the first nanostructure layer is a resistor of the wireless sensor node, a second nanostructure layer comprising a second plurality of patterned nanostructures embedded in an electrically insulating matrix, wherein the second nanostructure layer is an inductor of the wireless sensor node, and a third nanostructure layer comprising a third plurality of patterned nanostructures embedded in an electrically insulating matrix, wherein the third nanostructure layer is a capacitor of the wireless sensor node. In certain embodiments, the first nanostructure layer, second nanostructure layer, and third nanostructure layer are electrically coupled.

According to certain embodiments, a structural electronics wireless sensor node comprises a plurality of nanostructure layers, each layer comprising respective pluralities of patterned nanostructures embedded in an electrically insulating matrix, wherein a first nanostructure layer is a resistor of the wireless sensor node, a second nanostructure layer is an inductor of the wireless sensor node, and a third nanostructure layer is a capacitor of the wireless sensor node. In some embodiments, the structural wireless sensor node comprises an electrical connection between the plurality of nanostructure layers.

In some embodiments, a structural electronics element is described, wherein the structural electronics element comprises a first carbon nanotube layer comprising a plurality of patterned carbon nanotubes embedded in a structural polymer matrix, wherein the first carbon nanotube layer is a resistor of a wireless sensor node, and wherein the first carbon nanotube layer is configured in a planar fashion with at least a second carbon nanotube layer and/or is stacked vertically with at least a second carbon nanotube layer.

In some embodiments, a structural electronics element comprises a first carbon nanotube layer comprising a plurality of patterned carbon nanotubes embedded in a structural polymer matrix, wherein the first carbon nanotube layer is an RF resistor of a RF impedance matching circuit, and wherein the first carbon nanotube layer is configured in a planar fashion with at least a second carbon nanotube layer and/or is stacked vertically with at least a second carbon nanotube layer.

In certain embodiments, a structural electronics element comprises a first carbon nanotube layer comprising a plurality of patterned carbon nanotubes embedded in a structural polymer matrix, wherein the first carbon nanotube layer is an inductor of a wireless sensor node, and wherein the first carbon nanotube layer is configured in a planar fashion with at least a second carbon nanotube layer and/or is stacked vertically with at least a second carbon nanotube layer.

According to some embodiments, a structural electronics element comprises a first carbon nanotube layer comprising a plurality of patterned carbon nanotubes embedded in a structural polymer matrix, wherein the first carbon nanotube layer is a resistor of a wireless sensor node, and wherein the first carbon nanotube layer is configured in a planar fashion with at least a second carbon nanotube layer and/or is stacked vertically with at least a second carbon nanotube layer.

In certain embodiments, an antenna is described, wherein the antenna comprises a nanostructure layer comprising a plurality of patterned nanostructures embedded in an electrically insulating matrix, wherein the antenna serves an electronic function of a wireless sensor node.

Other advantages and novel features of the present technology will become apparent from the following detailed description of various non-limiting embodiments of the technology when considered in conjunction with the accompanying figures. In cases where the present specification and a document incorporated by reference include conflicting and/or inconsistent disclosure, the present specification shall control.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIB. 10B shows a non-limiting embodiment of a structural electronics wireless sensor node comprising an inductor and a capacitor.

Figure 11:
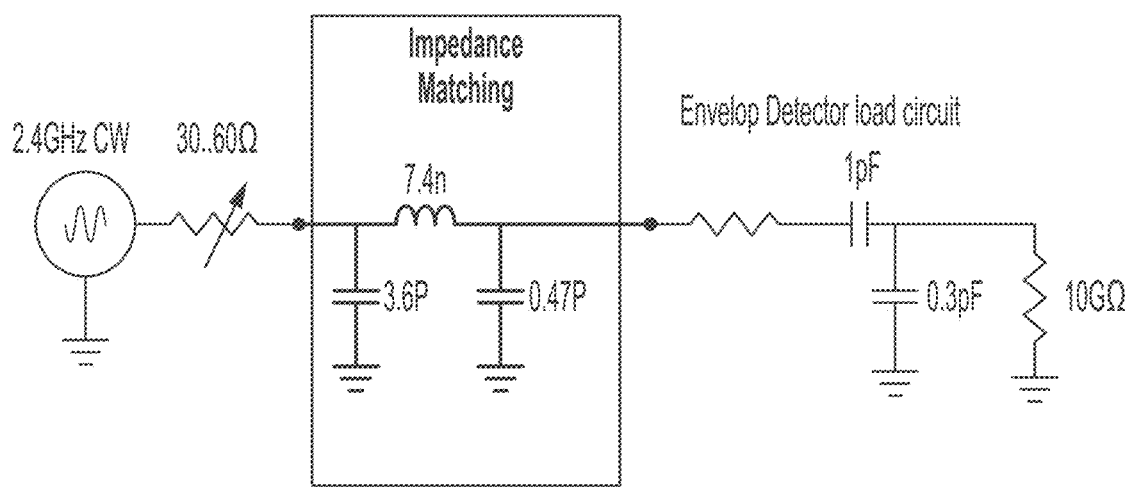
Figure 12:
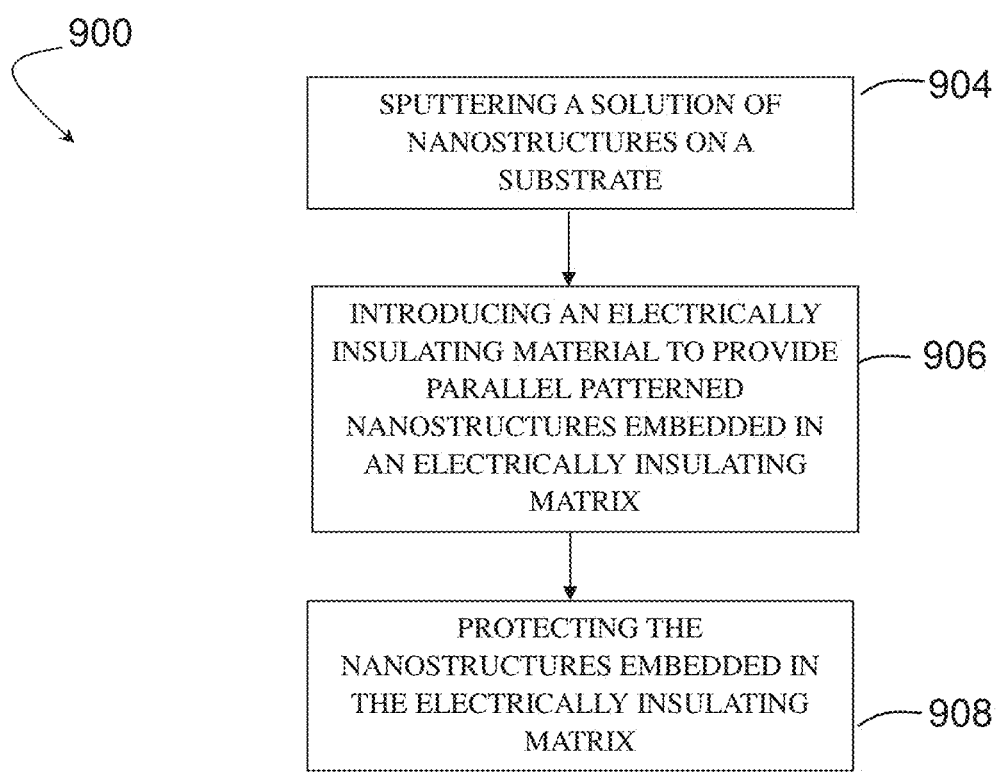
Figure 13A:
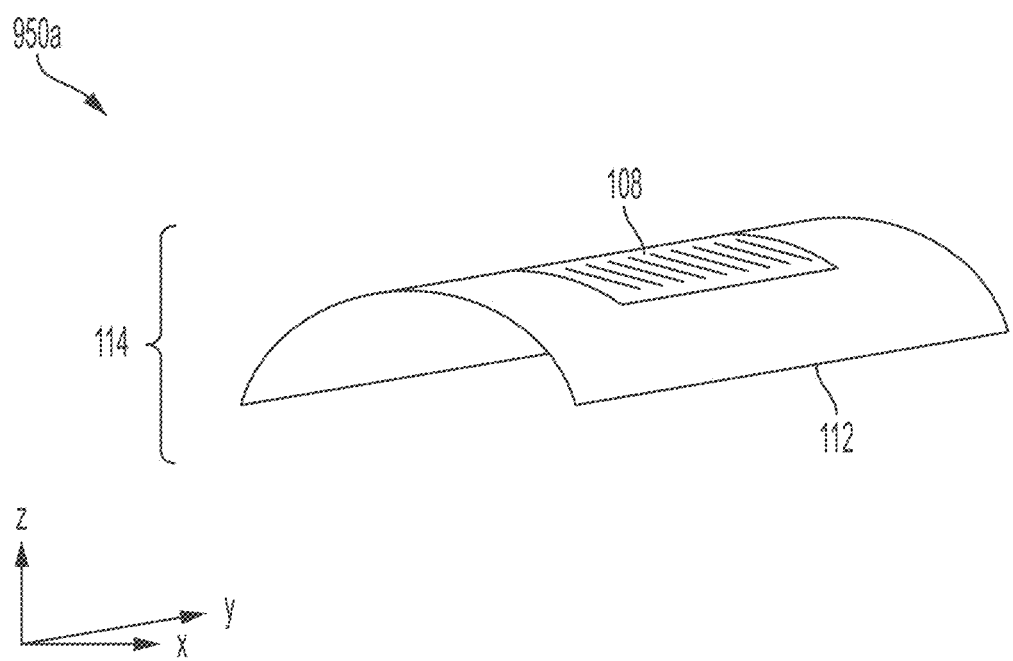
Figure 13B:
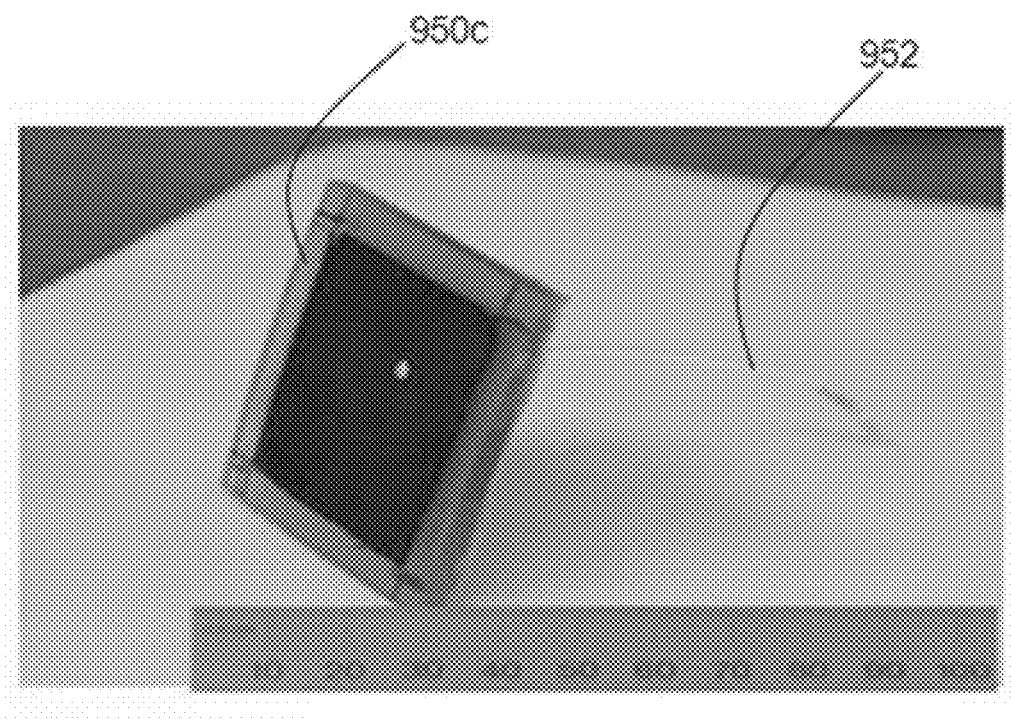
Figure 14:
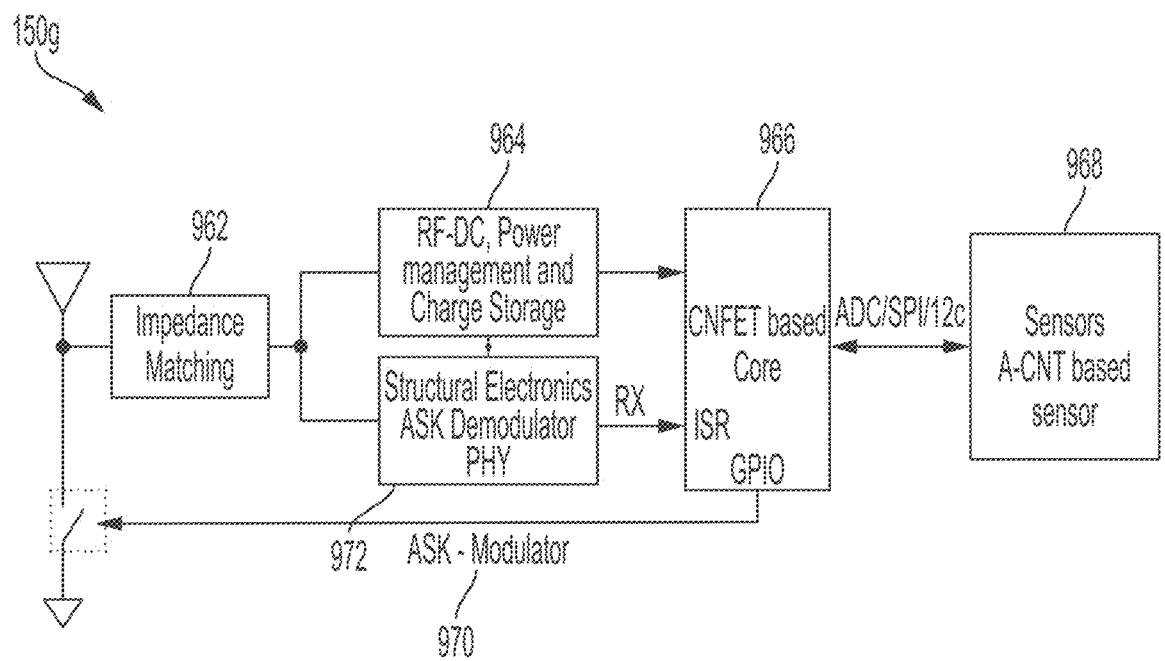
Figure 15:
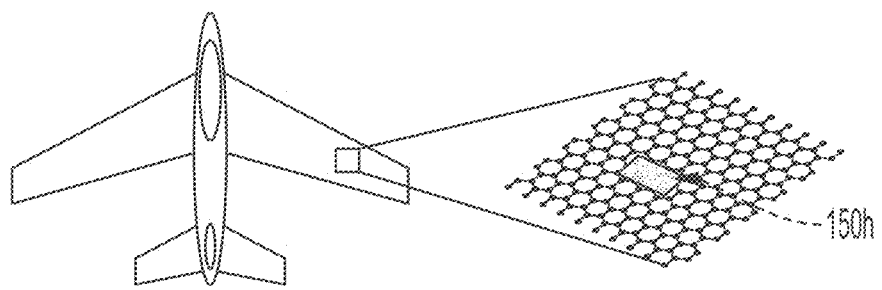
Figure 16:
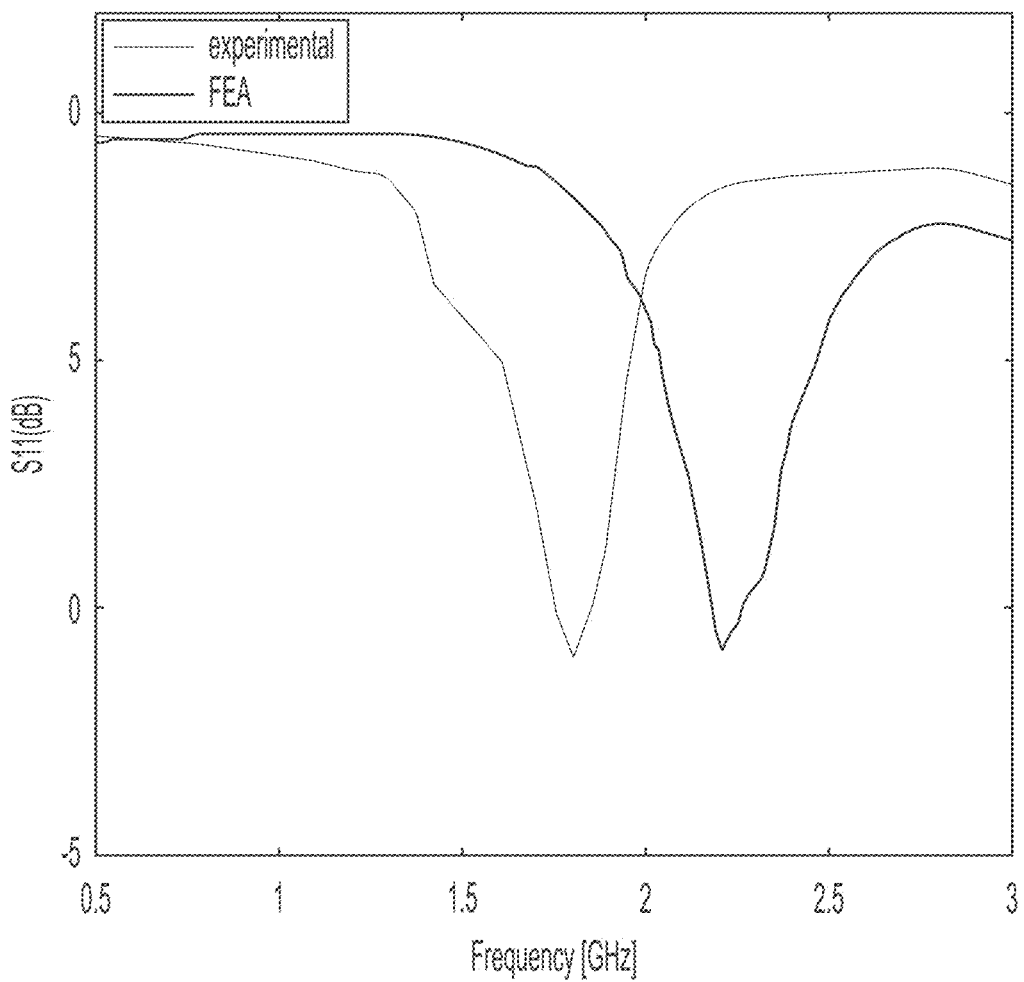
Figure 18A:
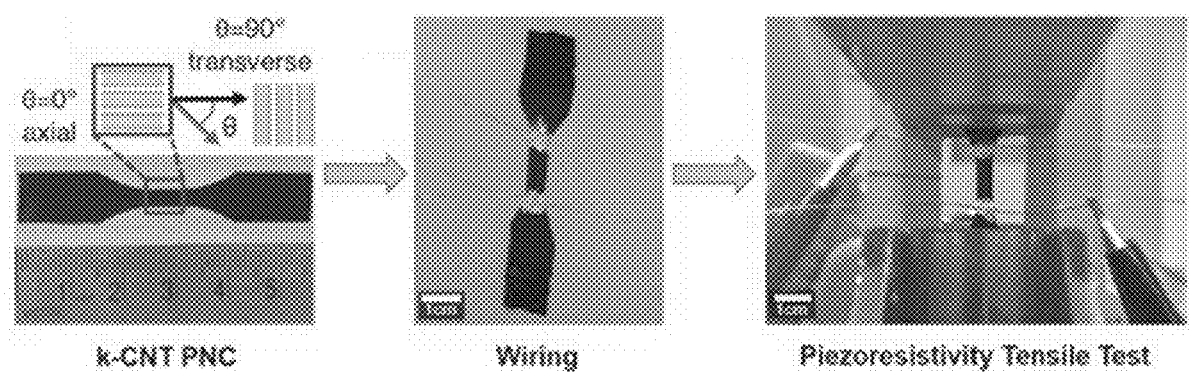
Figure 18B:
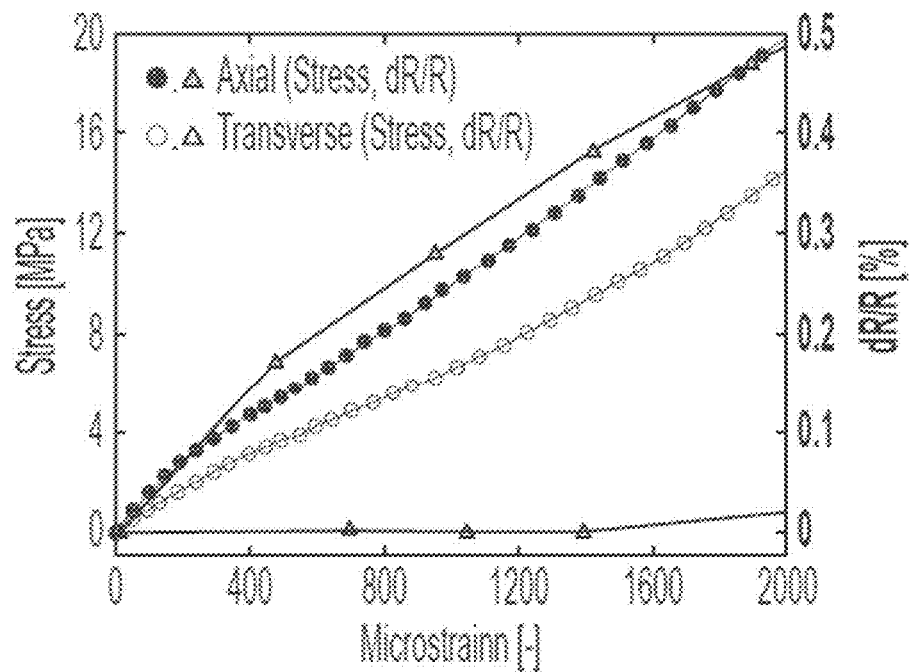
Figure 18C:
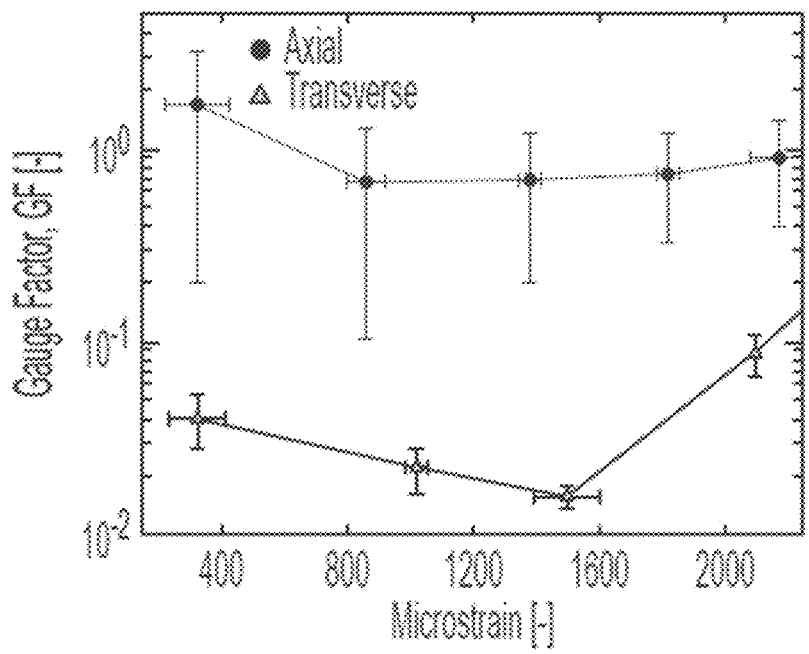
Figure 19A:
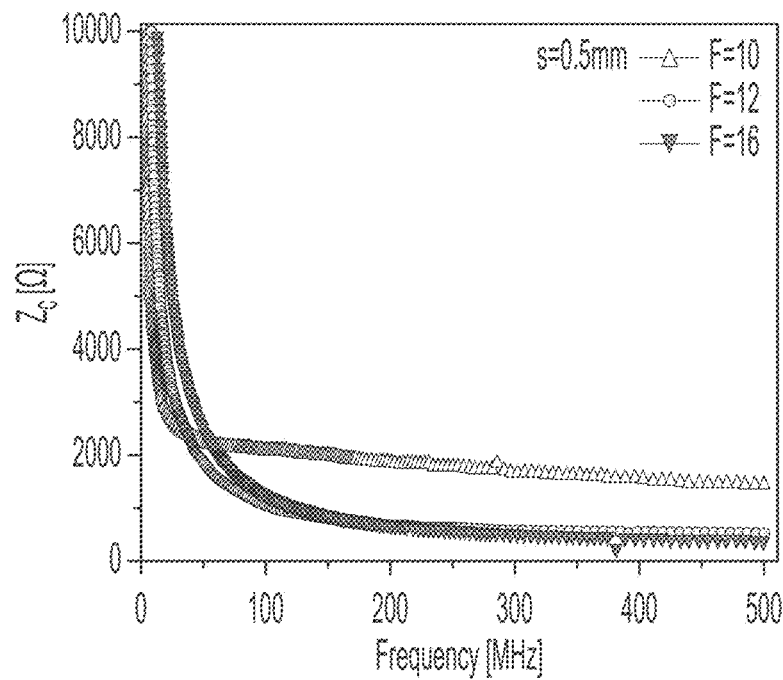
Figure 19B:
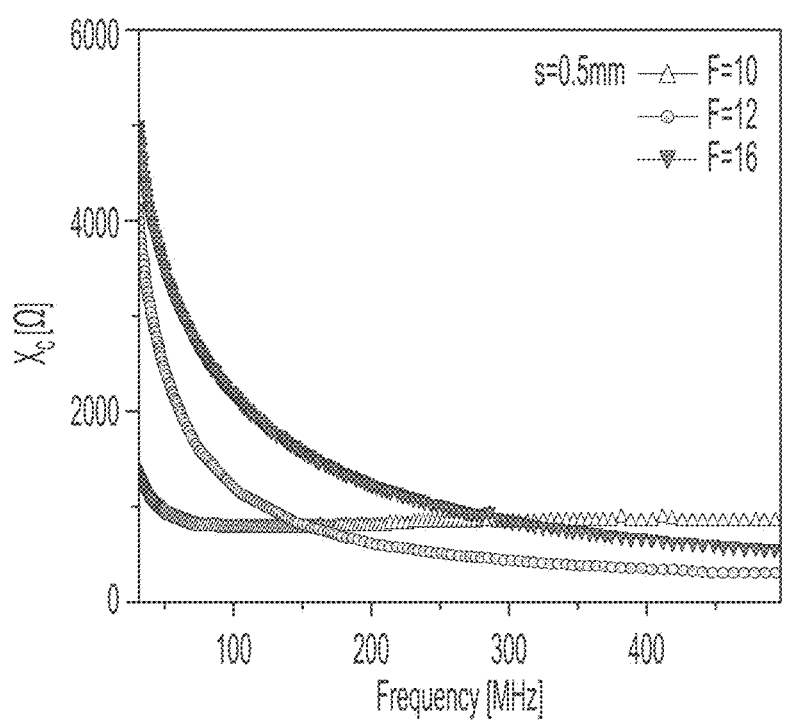
Figure 20A:
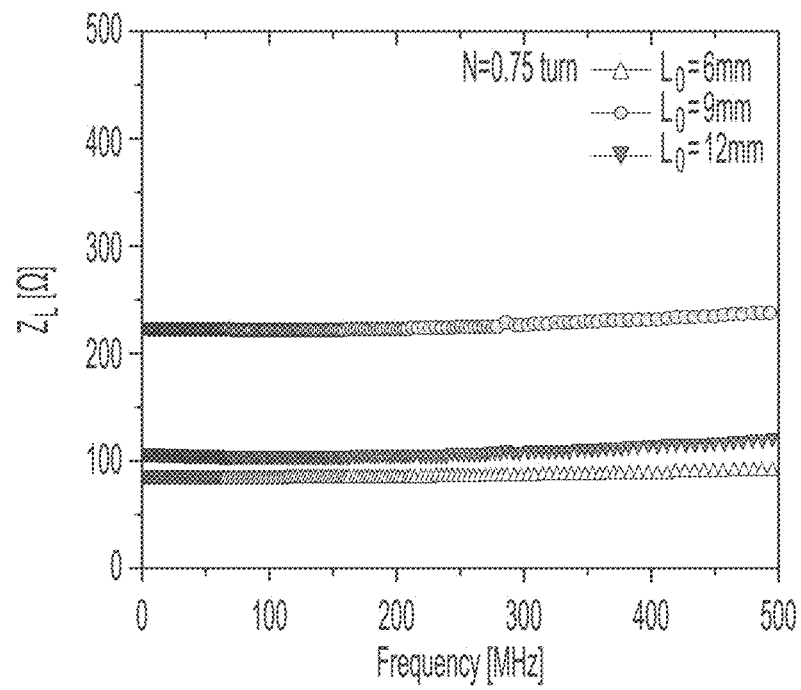
Figure 20B:
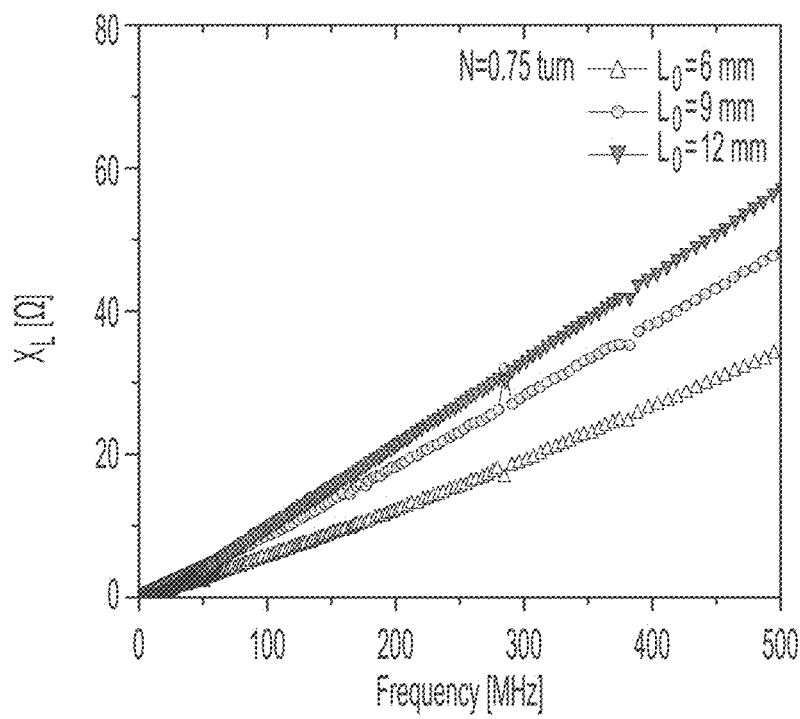
Figure 21A:
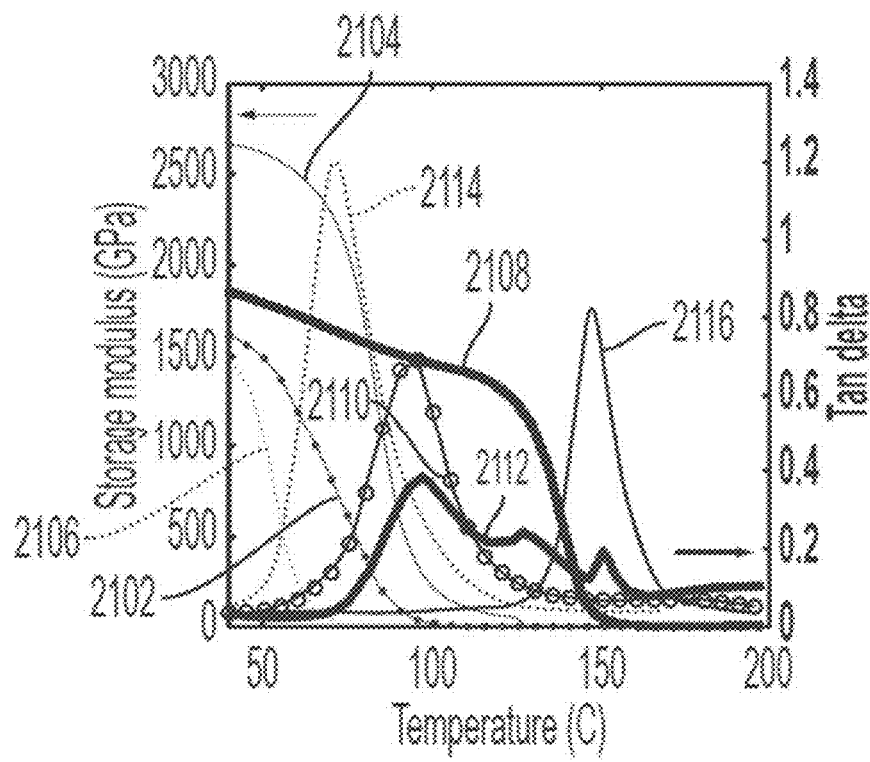
Figure 21B:
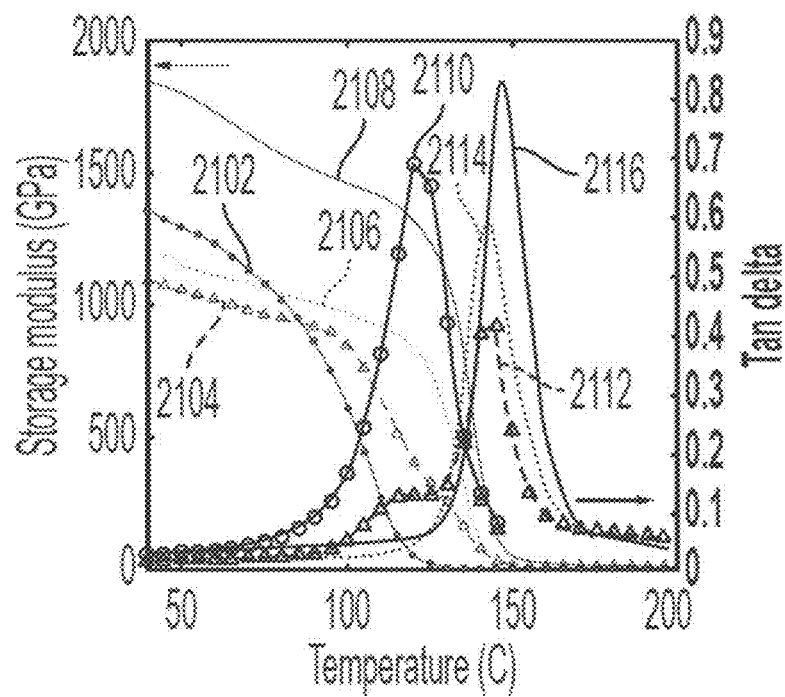
Figure 21C:
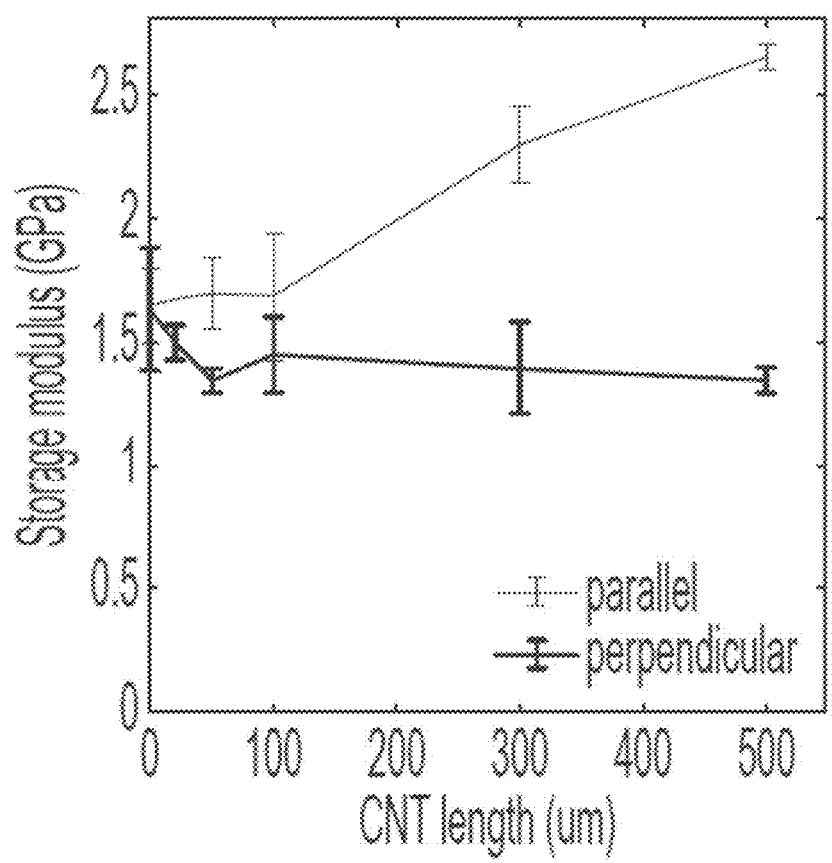
Figure 22A:
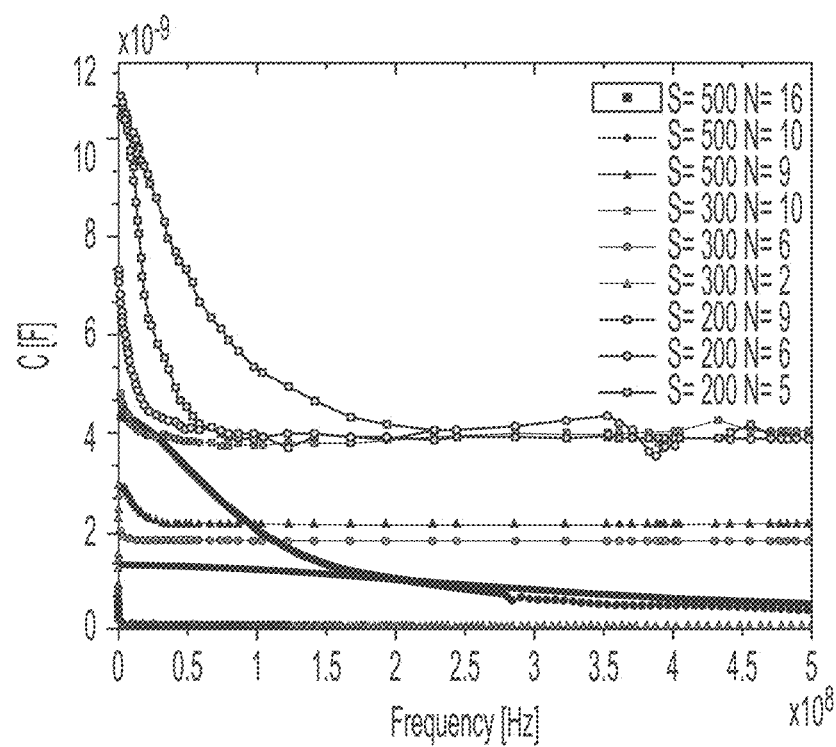
Figure 22B:
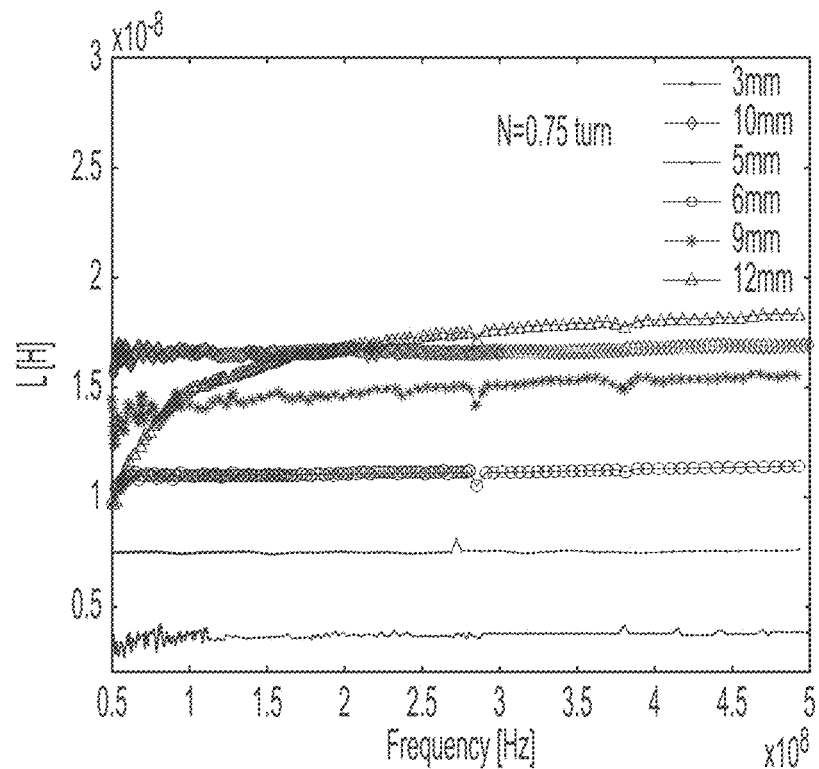

FIG. 11 illustrates an impedance matching element of a wireless sensor node, according to certain embodiments;

FIG. 12 is a flow chart of a non-limiting method of fabricating a flexible patch antenna;

FIG. 13A illustrates a perspective view of a flexible patch antenna, according to certain embodiments;

FIG. 13B shows a fabricated flexible patch antenna, according to certain embodiments;

FIG. 14 illustrates an exemplary embodiment of a wireless structural electronic sensor node, according to some embodiments;

FIG. 15 illustrates the integration of a structural wireless sensor node into a manufactured product, according to certain embodiments;

FIG. 16 shows a plot of the insertion loss S11 as a function of frequency for a fabricated antenna, according to certain embodiments, according to some embodiments;

FIG. 17A shows a plot of the resistivity of a structural electronics resistor with CNTs as a function of CNT length, according to certain embodiments;

FIG. 17B shows a plot of the sheet resistance of a structural electronics resistor with CNTs as a function of CNT length, according to some embodiments;

FIG. 17C shows a plot of the impedance of a structural electronics resistor as a function of frequency, according to certain embodiments;

FIG. 17D shows an alternate plot of the impedance of a structural electronics resistor as a function of frequency, according to some embodiments;

FIG. 18A shows the set-up for testing the piezoresistivity of a structural electronics resistor, according to certain embodiments;

FIG. 18B shows the piezoresistivity results, with stress of the structural electronics resistor shown as a function of microstrain, as is dR/R;

FIG. 18C shows a plot of the gauge factor of a structural electronics resistor as a function of microstrain, according to certain embodiments;

FIG. 19A shows a plot of the impedance of a structural electronics capacitor as a function of frequency, according to some embodiments;

FIG. 19B shows the reactance of the structural electronics capacitor as a function of frequency, according to certain embodiments;

FIG. 20A shows a plot of the impedance of a structural electronics inductor as a function of frequency, according to some embodiments;

FIG. 20B shows the reactance of the structural electronics inductors for which the impedance is shown in FIG. 20A;

FIG. 21A shows the dynamic mechanical analysis of a polymer nanocomposite with CNTs of length 50 microns, 150 microns, and 500 microns;

FIG. 21B shows the same type of data as FIG. 21A, but for the situation in which the tensile stress is perpendicular to the CNT axis;

FIG. 21C shows the dynamic mechanical analysis of a polymer nanocomposite with CNTs as a function of CNT length, according to some embodiments;

FIG. 22A shows a plot of the capacitance of a structural electronics capacitor as a function of frequency; and FIG. 22B shows a plot of the inductance of a structural electronics inductor as a function of frequency.

DETAILED DESCRIPTION

The embodiments described herein set forth structural electronics wireless sensor nodes that include components fabricated from semi-conducting or conducting patterned nanostructures (e.g., carbon nanostructures) in an electrically insulating matrix. As used herein, structural electronics can refer to a structure that has electronic components as an integral part of the material, and as a result, the electronics are not separable from the structural components. Forming the components of the structural electronics wireless sensor nodes from patterned nanostructures facilitates the ability to achieve small system or device size, for instance on the microscale or nanoscale. For example, in some embodiments, the structural electronics wireless sensor node is a compact stand-alone sensor contained within a housing and/or body that lacks external electrical connections, contacts, and/or connections (e.g., pins). In some embodiments, the structural electronics wireless sensor node may therefore represent an example of a zero-pin sensor. Furthermore, in certain embodiments wherein the components include patterned nanostructure embedded in an electrically insulating material, the strength (e.g., tensile strength), stiffness, and/or toughness of the nanostructures is at least the same as the strength, stiffness, and/or toughness of the electrically insulating material. Resultantly, the structural electronics wireless sensor node is configured to function as both a structure and an electronics element.

In some embodiments, the structural electronics wireless sensor node is configured to communicate sensed data wirelessly (e.g., via backscattering). Accordingly, in certain embodiments, the structural electronics wireless sensor node can advantageously be constructed without a transceiver. In some aspects, the structural electronics wireless sensor node is configured to generate energy to implement backscattering and provide power to various components of the sensor system. Resultantly, in certain embodiments, the structural electronics wireless sensor node may be constructed without an internal energy source, such as a battery-powered energy source. By constructing the structural electronics wireless sensor node without a transceiver and/or internal energy source, the wireless sensor node can operate at substantially lower power than wireless sensor nodes that include a transceiver and/or internal energy source. For example, in some embodiments, the structural electronics wireless sensor node consumes less than 100 microwatts in operation, less than 50 microwatts in operation, less than 40 microwatts in operation, less than 30 microwatts in operation, or any value or range of values within that range. Alternatively, in some embodiments, the structural electronics wireless sensor node may be constructed with an internal energy source (e.g., a battery-powered energy source).

The embodiments described herein set forth structural electronics wireless sensor nodes that include resistor, inductor, and capacitor (RLC) components fabricated from patterned nanostructures. In some aspects, the structural electronics wireless sensor node may include an antenna (e.g., a flexible patch antenna, although it need not be flexible in all embodiments) fabricated from patterned nanostructures. In certain embodiments, the structural electronics wireless sensor node may comprise a transistor (e.g., a field-effect transistor). Forming the RLC components, antenna, and/or transistor of the structural electronics wireless sensor node from patterned nanostructures facilitates the ability to achieve a microscale and/or nanoscale system and/or device size.

Improved wireless sensor systems and methods of making the same are desirable. Aspects of the present application provide such systems and methods.

The aspects and embodiments described above, as well as additional aspects and embodiments, are further described below. These aspects and/or embodiments may be used individually, all together, or in any combination of two or more, as the application is not limited in this respect.

Some embodiments described herein relate to a structural electronics wireless sensor node. In some embodiments, the body of the structural electronics wireless sensor node comprises at least a first nanostructure layer and a second nanostructure layer, as is described in further detail below. In certain embodiments, the nanostructures of the first nanostructure layer and/or second nanostructure layer are semiconducting or conducting.

The term "nanostructure" is used herein in a manner consistent with its ordinary meaning in the art and refers to a structure that has a characteristic dimension, such as a cross-sectional diameter, or other appropriate dimension, that is greater than or equal to 1 nm and less than 1 micrometer. Specific characteristic dimensions of the nanostructure are described in more detail below. In some embodiments, the nanostructure is any of a variety of suitable nanostructures, such as a nanofiber, a nanowire, a nanorod, a nanoparticle, and/or the like. In certain aspects, the nanostructures are electrically conductive. The nanostructure may be an elongated nanostructure with a high aspect ratio (e.g., greater than 10, 100, 1,000, 10,000, or greater).

In certain embodiments, the nanostructures comprise carbon-based nanostructures. For example, in certain embodiments, the nanostructures comprise carbon nanotubes (CNTs). The term "carbon nanotube" is used herein in a manner consistent with its ordinary meaning in the art and refers to a substantially cylindrical molecule or nanostructure comprising a fused network of primarily six-membered rings (e.g., six-membered aromatic rings) comprising primarily carbon atoms. Further details regarding CNTs are described below.

In some embodiments, the nanostructures comprise metal. In some embodiments the metal is a semi-conducting or conducting metal. For example, the nanostructure may comprise silicon (Si), germanium (Ge), gold (Au), metal oxides (e.g., $In_2O_3$, $SnO_2$, ZnO), and/or the like.

In some embodiments, the body of the structural electronics wireless sensor node comprises a plurality of nanostructure layers (e.g., CNT layers). For example, in some embodiments, the body of the structural electronics wireless sensor node comprises two or more (e.g., three, four, five, six, etc.) nanostructure layers. In some aspects, the body of the structural electronics wireless sensor node is three-dimensional. In certain embodiments, the nanostructure layers are configured in a planar fashion. For example, a first nanostructure layer and a second nanostructure layer are configured in a planar fashion if the edges of the first nanostructure layer and the edges of the second nanostructure layer intersect only at their endpoints. In some embodiments, the nanostructure layers are stacked vertically. For example, a first nanostructure layer and a second nanostructure layer are stacked vertically if at least a portion of a surface of the first nanostructure layer overlaps with at least a portion of a surface of the second nanostructure layer. In certain embodiments wherein the body of the structural electronics wireless sensor node comprises at least three nanostructure layers, at least a portion of the nanostructure layers may be configured in a planar fashion and at least a portion of the nanostructure layers may be stacked vertically.

According to some embodiments, each of the nanostructure layers comprise a plurality of patterned nanostructures embedded in an electrically insulating matrix. In certain embodiments, the electrically insulating matrix is a structural polymer matrix and/or a ceramic matrix. According to certain embodiments, the structural polymer matrix comprises any of a variety of suitable polymer materials. For example, in certain embodiments, the structural polymer matrix is a substrate suitable for embedding nanostructures (e.g., CNTs). In some embodiments, the structural polymer matrix is a dielectric polymer, a thermoplastic, a polymer film, a fiber-reinforced polymer composite layer (e.g., a prepreg layer), or any other polymer form that is amenable to layer-by-layer construction. As used herein, the term "prepreg" refers to one or more layers of thermoset or thermoplastic resin containing embedded fibers, for example fibers of carbon, glass, silicon carbide, and the like. In some embodiments, the structural polymer matrix is an epoxy resin (e.g., EPON resin), paramethylstyrene (PMS), paramethoxyamphetamine (PMA), a polyimide, polyether ether ketone (PEEK), polyether ketone ketone (PEKK), bis-maleimide (BMI), a cyanate ester, or combinations thereof.

Figure 1A:
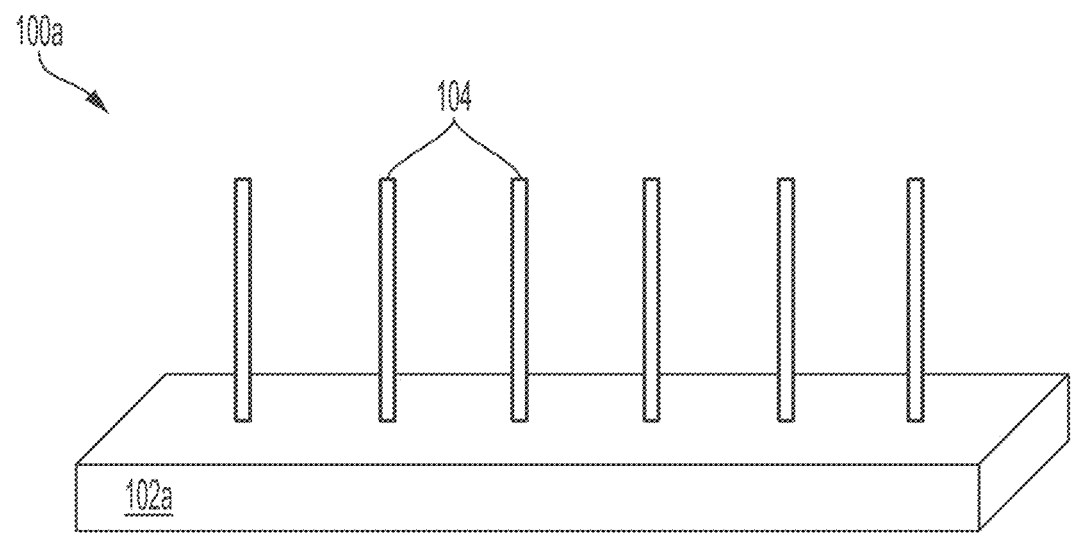
FIG. 1A illustrates a forest of vertically aligned patterned nanostructures grown on a substrate, in accordance with certain embodiments.

The nanostructure layers of structural electronics body may be fabricated by any of a variety of suitable techniques, which is described herein with reference to the figures. For example, FIG. 1A illustrates a forest of vertically aligned patterned nanostructures grown on a substrate, according to some embodiments. As shown in FIG. 1A, a forest of vertically aligned patterned nanostructures 104 is grown on substrate 102a. As used herein, a "forest" of nanostructures (e.g., elongated nanostructures) corresponds to a plurality of nanostructures arranged in side-by-side fashion with one another. In some embodiments, the nanostructures are patterned by any of a variety of suitable growth methods. For example, according to certain embodiments, the method of growing nanostructures includes providing an active growth material or an active growth material precursor and exposing a precursor of the nanostructures to the active growth material or active growth material precursor. In some aspects, the active growth material or active growth material precursor may be a mask on the substrate. According to certain embodiments, the active growth material or active growth material precursor may be provided on the substrate in any of a variety of desired patterns, and the nanostructures may be grown in any of a variety of desired patterns, within such predetermined variance. In some embodiments, the method comprises sputtering a solution of nanostructures on the substrate. Additional growth methods are described herein in greater detail. The substrate used to grow the nanostructures may be any of a variety of suitable substrates, such as a glass fiber, a carbon fiber, a silicon substrate, and the like. According to certain embodiments, the forest of vertically patterned nanostructures may be of any desirable length, width, and/or thickness.

Figure 1B:
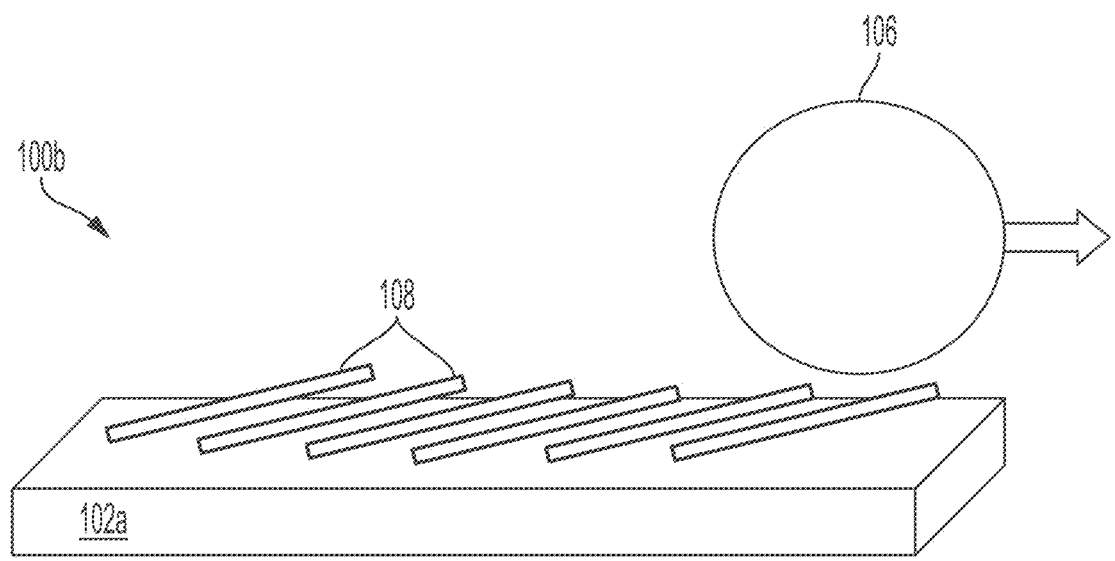
FIG. 1B illustrates a forest of parallel patterned nanostructures on a substrate, in accordance with some embodiments.

In some embodiments, the forest of vertically aligned patterned nanostructures may be knocked down to provide a forest of parallel patterned nanostructures on a substrate. FIG. 1B illustrates a forest of parallel patterned nanostructures on a substrate, according to certain embodiments. As shown in FIG. 1B, roller 106 may be used to knock down forest of vertically aligned patterned nanostructures 104 (shown in FIG. 1A), thereby providing forest of parallel patterned nanostructures 108 on substrate 102a. Without wishing to be bound by theory, the vertically aligned patterned nanostructures may be knocked down by any of a variety of suitable techniques including mechanically (e.g., with a roller, with a glass rod, or with another suitable mechanical instrument), with a solvent, or by any other suitable manner.

Alternatively, in certain non-limiting embodiments, a nanostructure mat may be provided and patterned in order to provide a forest of vertically aligned patterned nanostructures on a substrate. For example, in some non-limiting embodiments buckypaper may be provided and patterned.

Figure 1C:
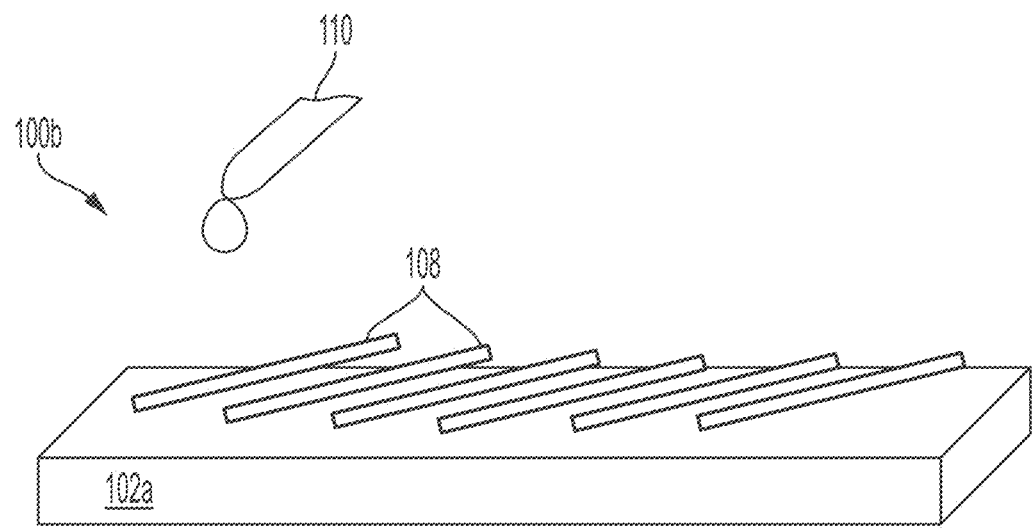
FIG. 1C illustrates the introduction of an electrically insulating material to a forest of parallel patterned nanostructures on a substrate, in accordance with certain embodiments.

In certain embodiments, an electrically insulating material is provided to the forest of parallel patterned nanostructures in order to embed the parallel patterned nanostructures in an electrically insulating matrix (e.g., a structural polymer matrix). The electrically insulating material may be provided by any of a variety of suitable techniques, such as drop-casting. FIG. 1C illustrates the introduction of an electrically insulating material to a forest of parallel patterned nanostructures on a substrate, according to some embodiments. As shown in FIG. 1C, electrically insulating material 110 is drop-casted onto forest of parallel patterned nanostructures 108 on substrate 102a. In certain embodiments, the parallel patterned nanostructures and the electrically insulating material may be spin-coated, thermally cured, thermally processed, deposited, and/or delaminated in order to embed the parallel patterned nanostructure in the electrically insulating material.

Figure 1D:
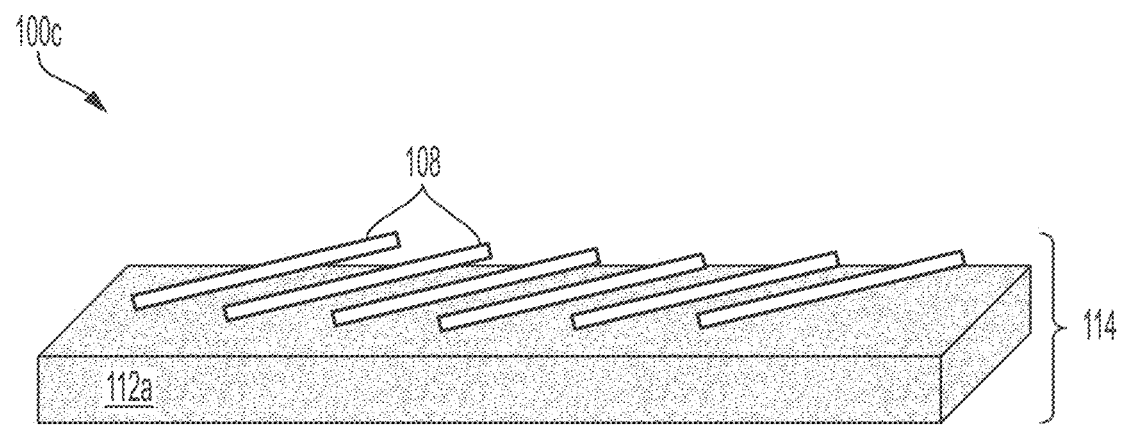
FIG. 1D illustrates a nanostructure layer of a structural electronics wireless sensor node comprising parallel patterned nanostructures embedded in an electrically insulating matrix, in accordance with some embodiments.

In certain embodiments, the nanostructures and the electrically insulating material form a unitary layer that serves an electronic function of the structural electronics wireless sensor node. FIG. 1D illustrates a nanostructure layer of a structural electronics wireless sensor node comprising parallel patterned nanostructures embedded in an electrically insulating material. As shown in FIG. 1D, nanostructure layer 114 comprises parallel patterned nanostructures 108 embedded in electrically insulating matrix 112a.

Figure 2A:
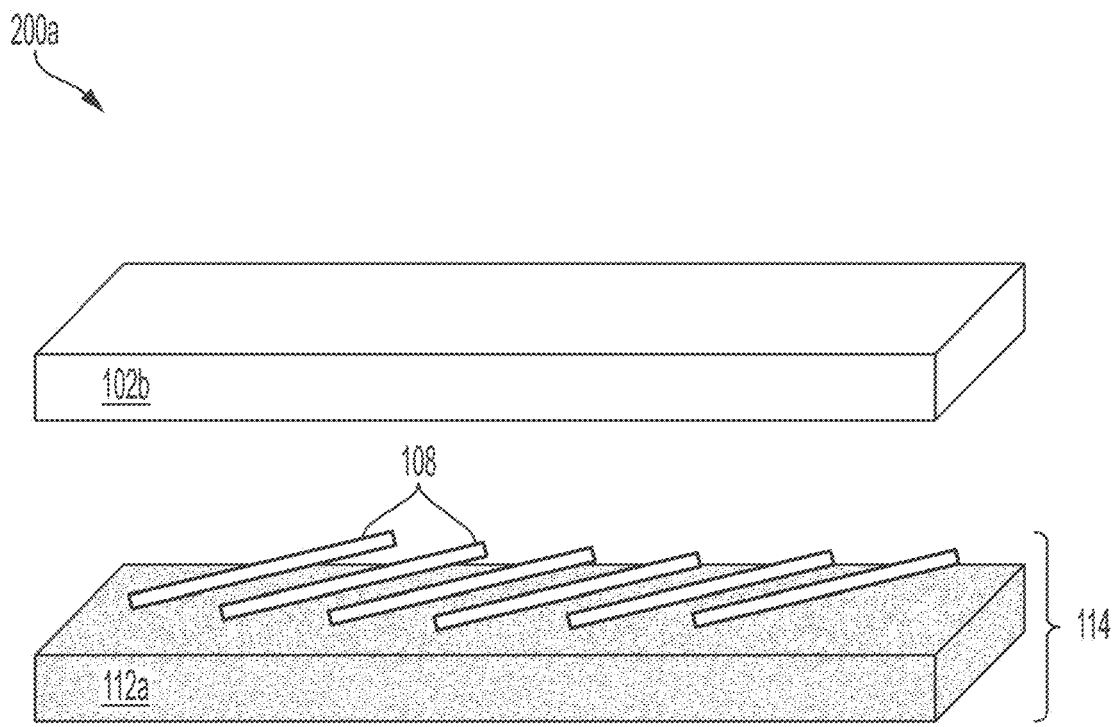
FIG. 2A illustrates the introduction of a second substrate to a first nanostructure layer comprising parallel patterned nanostructures embedded in an electrically insulating matrix, in accordance with certain embodiments.
Figure 2B:
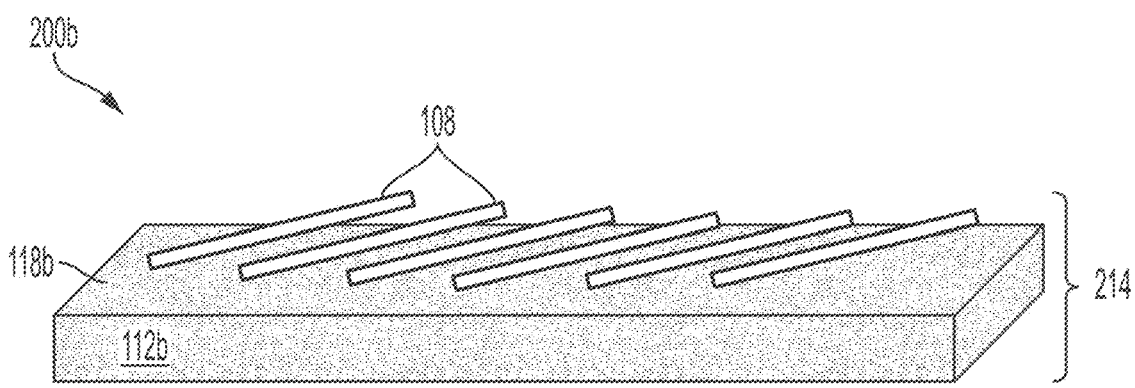
FIG. 2B illustrates a first nanostructure layer comprising parallel patterned nanostructures embedded in an electrically insulating matrix and a second nanostructure layer comprising parallel patterned nanostructures embedded in an electrically insulating matrix, in accordance with some embodiments.
Figure 2B:
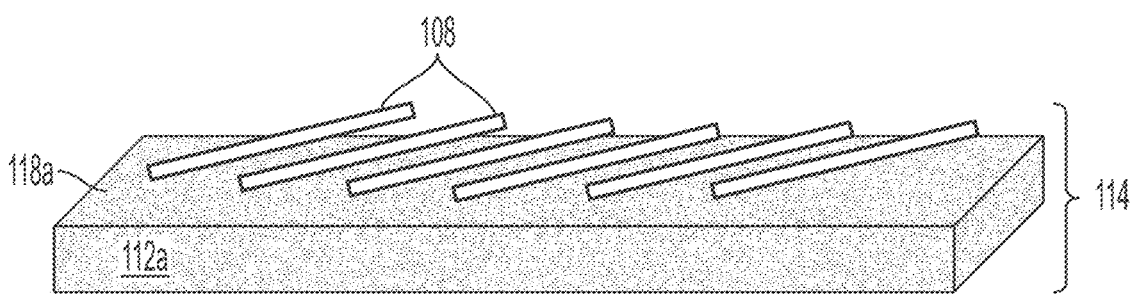

In certain embodiments, a second nanostructure layer of the structural electronics body comprises a second plurality of patterned nanostructures embedded in an electrically insulating material. FIG. 2A illustrates the introduction of a second substrate to a first nanostructure layer comprising parallel patterned nanostructures embedded in an electrically insulating matrix, according to certain embodiments. As shown in FIG. 2A, substrate 102b (e.g., second substrate), is introduced to nanostructure layer 114 (e.g., first nanostructure layer) comprising parallel patterned nanostructures 108 embedded in electrically insulating matrix 112a. The second nanostructure layer may be fabricated by the fabrication techniques described above with reference to FIG. 1A to FIG. 1D. Resultantly, FIG. 2B illustrates a first nanostructure layer comprising parallel patterned nanostructures embedded in an electrically insulating matrix and a second nanostructure layer comprising parallel patterned nanostructures embedded in an electrically insulating matrix, according to some embodiments. As shown in FIG. 2B, first nanostructure layer 114 comprises parallel patterned nanostructures 108 embedded in structural polymer matrix 112a and second nanostructure layer 214 comprises parallel patterned CNTs 108 embedded in structural polymer matrix 112b. According to certain embodiments, the first nanostructure layer and the second nanostructure layer may be designed and fabricated separately (e.g., in a step-wise fashion). In some other embodiments, the first nanostructure layer and the second nanostructure layer may be designed and fabricated concurrently.

According to certain embodiments, the structural wireless sensor node may comprise more than two nanostructure layers. For example, the structural wireless sensor node may comprise a plurality of nanostructure layers (e.g., three, four, five, six, etc. nanostructures layers) that each comprise parallel patterned nanostructures embedded in an electrically insulating matrix. In some embodiments, the plurality of nanostructure layers (e.g., three, four, five, six, etc. nanostructures layers) may be fabricated by the techniques described herein with reference to FIG. 1A to FIG. 1D.

Figure 3A:
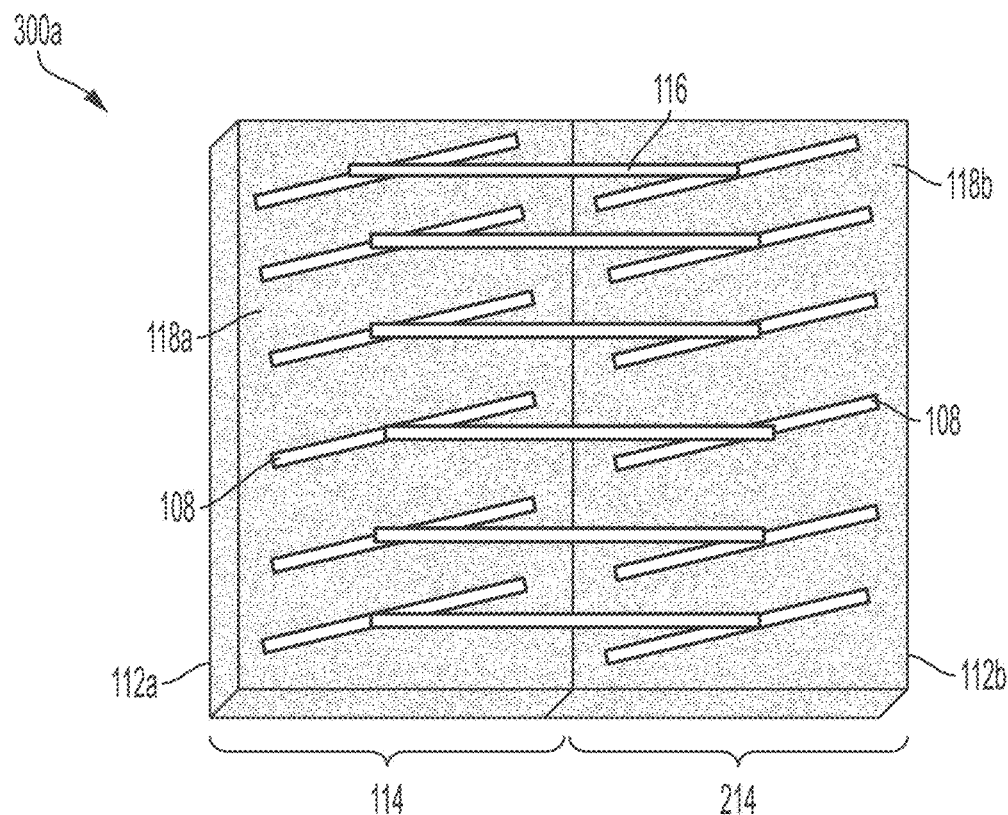
FIG. 3A illustrates a first nanostructure layer and a second nanostructure layer configured in a planar fashion forming a structural electronics wireless sensor node, according with certain embodiments.
Figure 3B:
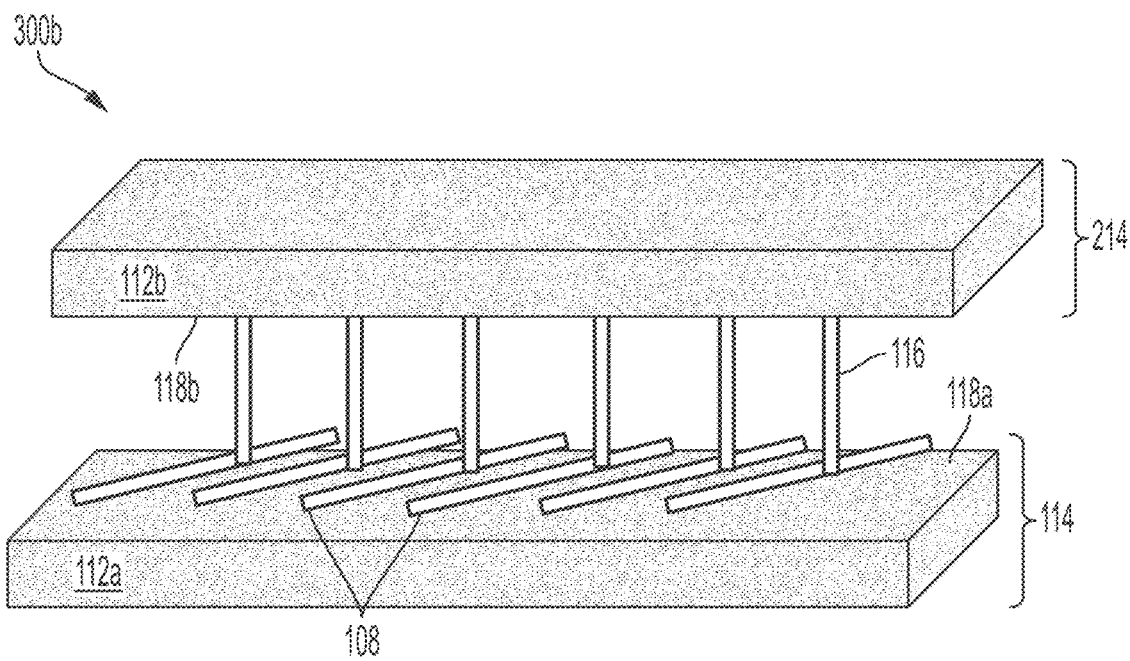
FIG. 3B illustrates a first nanostructure layer and a second nanostructure layer stacked vertically forming a structural electronics wireless sensor node, in accordance with some embodiments.

According to some embodiments, the plurality of nanostructure layers each serve a respective electronic function of the structural electronics wireless sensor node. For example, in some embodiments, the first nanostructure layer serves a first electronic function of the wireless sensor node and the second nanostructure layer serves a second electronic function of the wireless sensor node. FIG. 3A illustrates a first nanostructure layer and a second nanostructure layer configured in a planar fashion forming a structural electronics wireless sensor node. Alternatively, FIG. 3B illustrates a first nanostructure layer and a second nanostructure layer stacked vertically forming a structural electronics wireless sensor node. Referring to FIG. 3A and FIG. 3B, first nanostructure layer 114 comprising parallel patterned nanostructures 109 embedded in electrically insulating matrix 112a serves a first electronic function of the wireless sensor node, and second nanostructure layer 214 comprising parallel patterned CNTs 108 embedded in structural polymer matrix 112b serves a second electronic function of the wireless sensor node. As shown in FIG. 3A, edges of first nanostructure layer 114 and second nanostructure layer 214 intersect only at their endpoints. Alternatively, as shown in FIG. 3B, at least a portion of surface 118a of first nanostructure layer 114 overlaps with at least a portion of surface 118b of second nanostructure layer 214. According to certain embodiments, various electronic components of the structural electronics wireless sensor node may be fabricated by employing the same fabrication techniques with different growth and/or patterning methods. Non-limiting examples of certain electronic components which may be formed from the nano structure layers are described in further detail below.

In some embodiments, the first nanostructure layer comprising a first plurality of patterned nanostructures embedded in an electrically insulating matrix is electrically coupled to the second nanostructure layer of the body comprising a second plurality of patterned nanostructures embedded in an electrically insulating matrix. According to certain embodiments, the first nanostructure layer and the second nanostructure layer are electrically coupled by one or more electrical connections that bridge the first nanostructure layer and the second nanostructure layer. Accordingly, in certain embodiments, the structural electronics wireless sensor node comprises an electrical connection between the first nanostructure layer and the second nanostructure layer that couples the first plurality of patterned nanostructures of the first nanostructure layer with the second plurality of nanostructures of the second nanostructure layer.

In some embodiments, the electrical connection may be a coupler. In certain embodiments, the coupler may comprise one or more nanostructures, although other types of connections may be used in alternative embodiments. In certain non-limiting embodiments, the nanostructure coupler is a CNT coupler. In certain embodiments, the electrical connection is a via. As shown in FIG. 3A and FIG. 3B, first nanostructure layer 114 comprising parallel patterned nanostructures 108 embedded in electrically insulating matrix 112a and second nanostructure layer 214 comprising parallel patterned nanostructures 204 embedded in electrically insulating matrix 112b are electrically coupled through one or more electrical connections 116. In some embodiments, the first nanostructure layer and the second nanostructure layer are coupled through one or more electrical connections 116 across surface 118a of first nanostructure layer and surface 118b of second nanostructure layer.

In some embodiments, the structural electronics wireless sensor node may be particularly strong, stiff, and/or tough.

Resultantly, the structural electronics wireless sensor node is configured to function as both an individual structure and an electronics element. For example, in some embodiments, the strength (e.g., tensile strength), stiffness, and/or toughness of the nanostructures is at least the same as the strength, stiffness, and/or toughness of the electrically insulating material. For example, in certain embodiments the structural electronics wireless sensor node may have the same strain throughout the bulk of the material.

In certain embodiments, the structural electronics wireless sensor node has an elastic modulus. In some aspects, the axial elastic modulus of the structural electronics wireless sensor node is greater than or equal to 1 GPa, greater than or equal to 5 GPa, greater than or equal to 6 GPa, greater than or equal to 7 GPa, greater than or equal to 8 GPa, greater than or equal to 9 GPa, or greater than or equal to 10 GPa. In some embodiments, the axial elastic modulus of the structural electronics wireless sensor node is less than or equal to 15 GPa, less than or equal to 10 GPa, less than or equal to 9 GPa, less than or equal to 8 GPa, less than or equal to 7 GPa, or less than or equal to 6 GPa. Combinations of the above recited ranges are also possible. In certain embodiments, the transverse elastic modulus of the structural electronics wireless sensor node is greater than or equal to 1 GPa, greater than or equal to 3 GPa, greater than or equal to 4 GPa, greater than or equal to 5 GPa, greater than or equal to 6 GPa, greater than or equal to 7 GPa, greater than or equal to 8 GPa, greater than or equal to 9 GPa, or greater than or equal to 10 GPa. In some embodiments, the transverse elastic modulus of the structural electronics wireless sensor node is less than or equal to 15 GPa, less than or equal to 10 GPa, less than or equal to 9 GPa, less than or equal to 8 GPa, less than or equal to 7 GPa, or less than or equal to 6 GPa, less than or equal to 5 GPa, or less than or equal to 4 GPa. Combinations of the above recited ranges are also possible.

Figure 4:
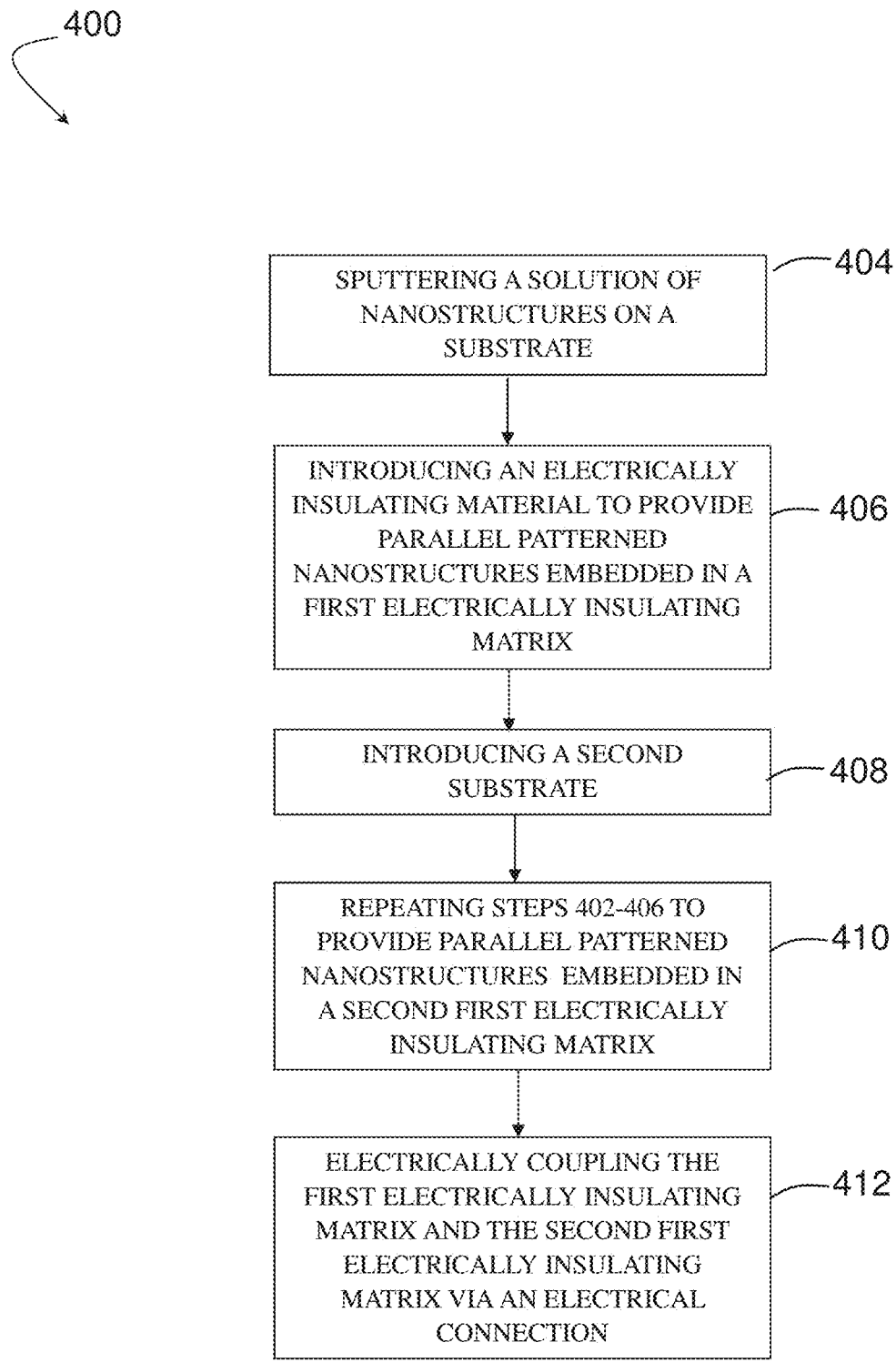
FIG. 4 is a flow chart of a non-limiting method of fabricating a wireless sensor node, in accordance with certain embodiments.

Some embodiments are related to a method of fabricating a structural electronics wireless sensor node. For example, FIG. 4 illustrates a flow chart describing a method of fabricating a wireless sensor node, according to certain embodiments. As shown in FIG. 4, method 400 comprises step 404 comprising sputtering a solution of nanostructures (e.g., CNTs) on a substrate. In some embodiments, step 406 of method 600 comprises introducing an electrically insulating material (e.g., a structural polymer) to provide parallel patterned nanostructures embedded in a first electrically insulating matrix 406. In certain aspects, step 408 of method 600 comprises introducing a second substrate, and step 410 comprises repeating steps 404 and 406 to provide parallel patterned nanostructures embedded in a second electrically insulating matrix. In some embodiments, method 600 further comprises step 412 comprising electrically coupling the first electrically insulating matrix and the second electrically insulating matrix via an electrical connection. In certain aspects, the method may further comprise introducing additional substrates (e.g., a third substrate, a fourth substrate, etc.), and repeating 404 to 406 to provide additional nanostructure layers comprising parallel patterned nanostructures embedded in an electrically insulating matrix, each of which may be coupled to the first electrically insulating matrix and/or the second electrically insulating matrix.

Various types of electronic components may be formed as part of the multi-layer structural electronics wireless sensor node. In some embodiments, for example, passive electronic components may be formed. In some aspects, the structural electronics wireless sensor node is a passive structural electronics wireless sensor node. In certain embodiments, active electronic components may be formed.

Figure 5A:
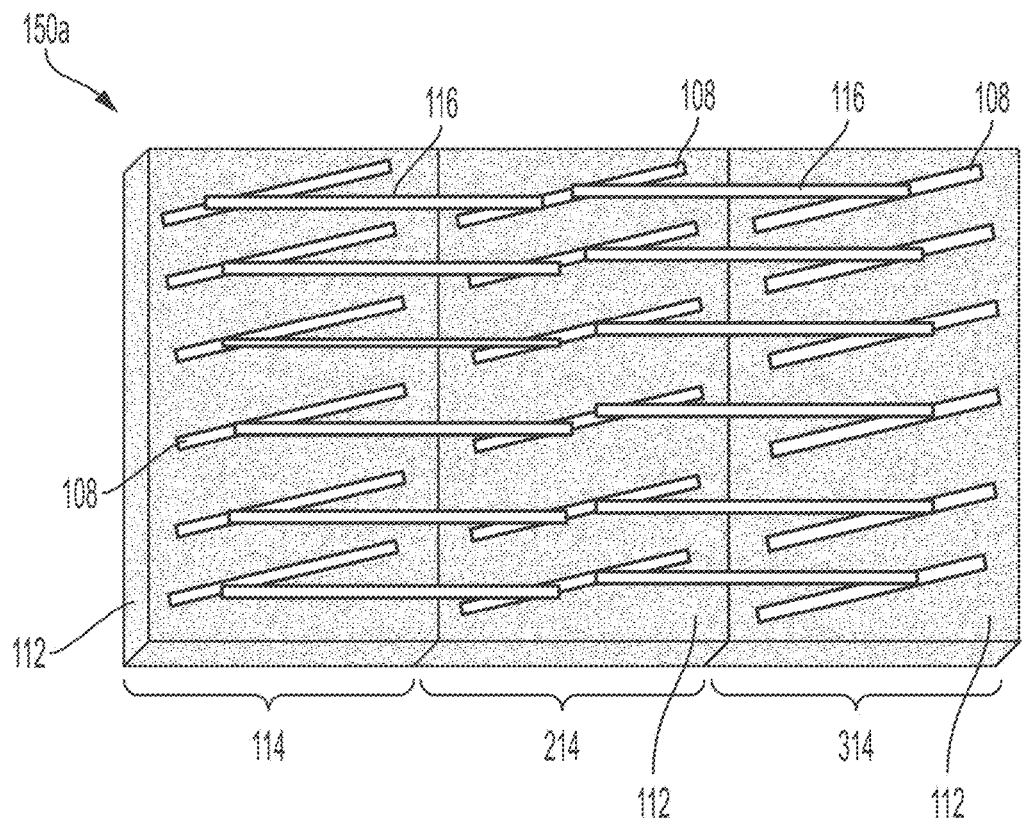
FIG. 5A illustrates a structural wireless sensor node comprising a first nanostructure layer, a second nanostructure layer, and a third nanostructure layer configured in a planar fashion forming a structural electronics wireless sensor node, in accordance with some embodiments.
Figure 5B:
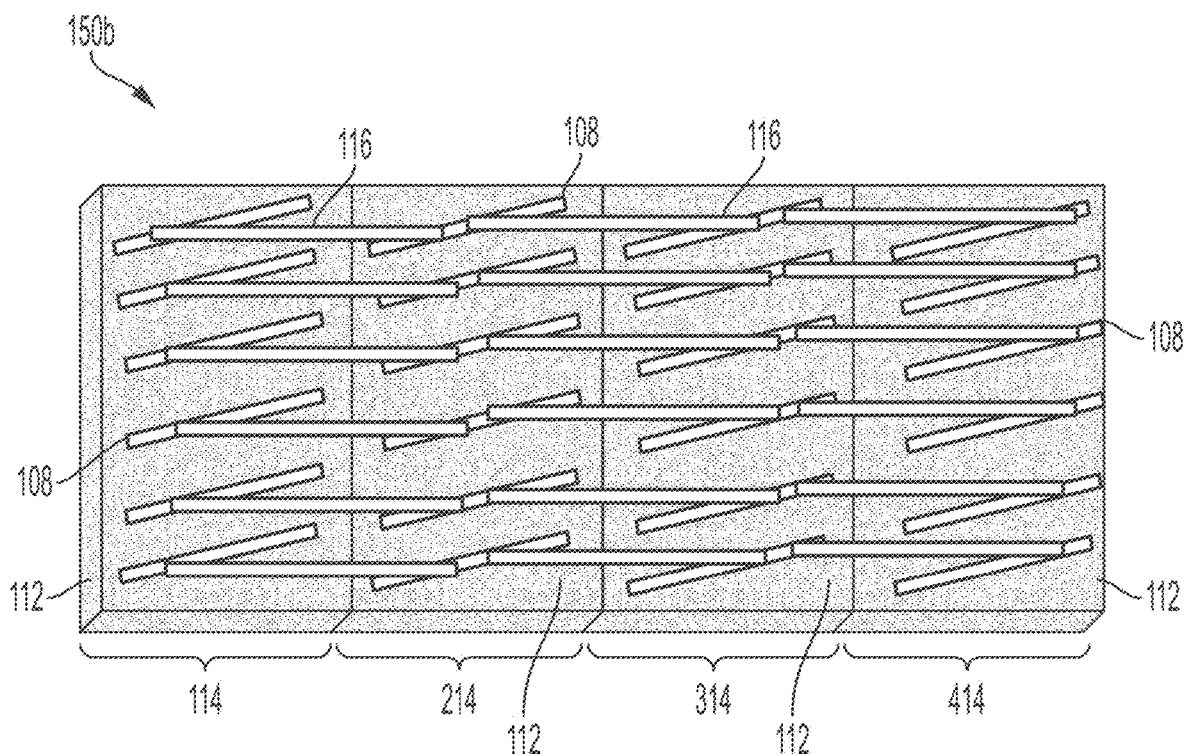
FIG. 5B illustrates a structural wireless sensor node comprising a first nanostructure layer, a second nanostructure layer, a third nanostructure layer, and a fourth nanostructure layer configured in a planar fashion forming a structural electronics wireless sensor node, in accordance with some embodiments.
Figure 5C:
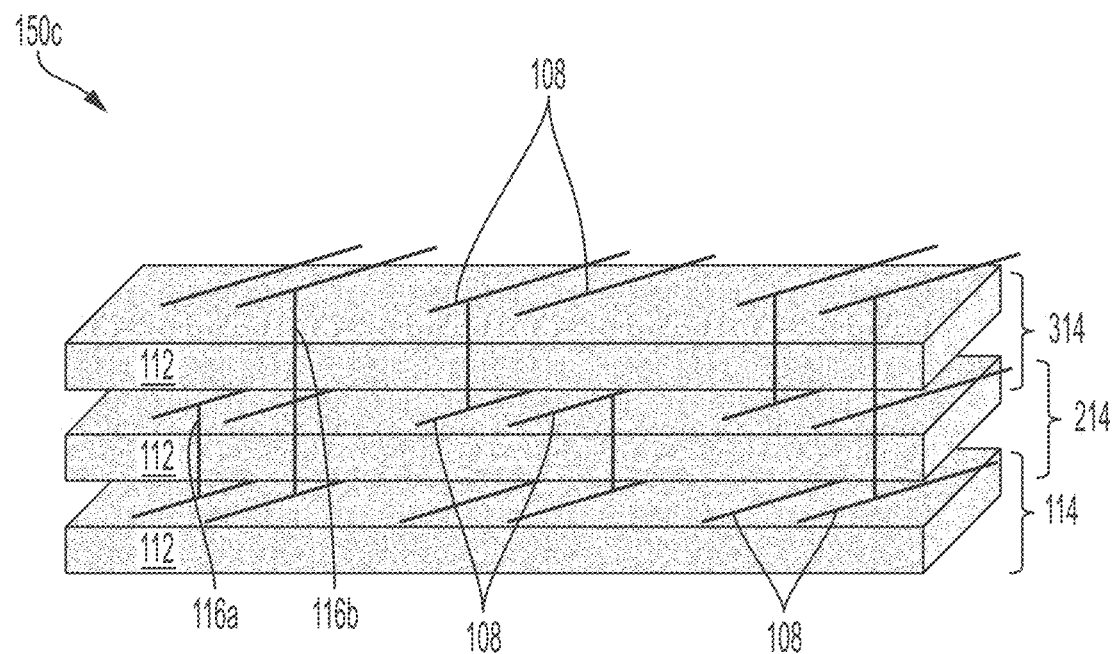
FIG. 5C illustrates a structural wireless sensor node comprising a first nanostructure layer, a second nanostructure layer, and a third nanostructure layer stacked vertically forming a structural electronics wireless sensor node, in accordance with certain embodiments.

Certain embodiments described herein relate to structural electronics RLC components. In some embodiments, the structural electronics wireless sensor node comprises RLC components fabricated from nanostructure layers comprising a plurality of patterned nanostructures embedded in a structural polymer matrix. For example, in certain embodiments, the structural wireless sensor node may comprise a first nanostructure layer, a second nanostructure layer, and a third nanostructure layer that correspond to a resistor component, a inductor component, and a capacitor component, respectively. FIG. 5A illustrates a structural wireless sensor node comprising a first nanostructure layer, a second nanostructure layer, and a third nanostructure layer configured in a planar fashion forming a structural electronics wireless sensor node, according to certain embodiments. Alternatively, FIG. 5C illustrates a structural wireless sensor node comprising a first nanostructure layer, a second nanostructure layer, and a third nanostructure layer stacked vertically forming a structural electronics wireless sensor node, according to some embodiments. As shown in FIGS. 5A and 5C, structural electronics wireless sensor node 150 comprises first nanostructure layer 114, second nanostructure layer 214, and third nanostructure layer 314, which may correspond to a resistor component, a inductor component, and a capacitor component, respectively. According to certain embodiments, any combination of configurations related to the resistor, inductor, and/or capacitor may be envisioned such that each of the first nanostructure layer, second nanostructure layer, and/or third nanostructure layer may correspond to the resistor component, inductor component, and/or capacitor component.

According to certain embodiments, the resistor, inductor, and capacitor are components of the structural wireless sensor node. In some embodiments, the resistor, inductor, and/or capacitor of the structural electronics wireless sensor node are part of a circuit. In some aspects, the circuit is a RLC circuit, and the structural RLC components can be arranged in any of a variety of suitable manners as part of the circuit. In certain embodiments, the resistor, inductor, and/or capacitor are part of a radio frequency (RF) impedance matching circuit. In some embodiments, the resistor, formed of nanostructures, may operate as a substantially pure resistor even at radio frequencies, for example on the order of $10^8$ Hz (e.g., up to $5 \times 10^8$ Hz, up to $8 \times 10^8$ Hz, or any other suitable value). Referring to FIG. 5A and FIG. 5C, in certain embodiments, structural electronics wireless sensor node 150 is a circuit comprising a first nanostructure layer (e.g., a resistor), a second nanostructure layer (e.g., an inductor), and a third nanostructure layer (e.g., a capacitor). In some embodiments, the wireless sensor node 150 is a RLC circuit.

Figure 10A:
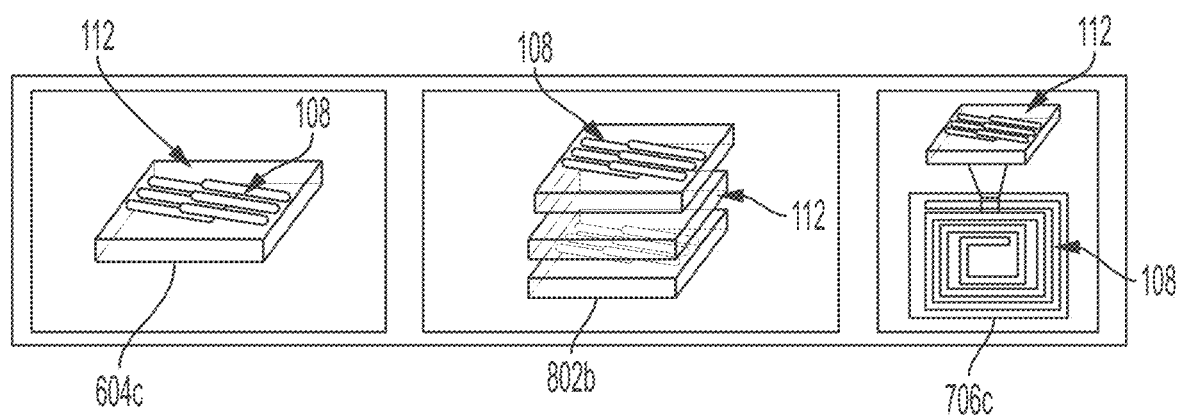
FIG. 10A illustrates a resistor, inductor, and capacitor structural electronic components of a wireless sensor node, according to certain embodiments.
Figure 10B:
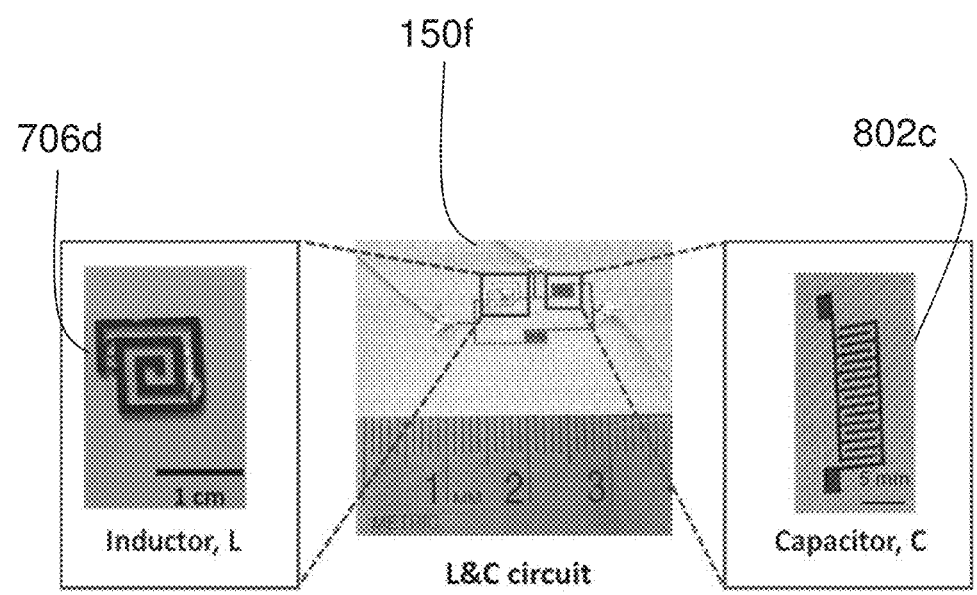

According to some embodiments, the structural electronics resistor, inductor, and/or capacitor are used for wireless sensor networks and wireless tagging applications. FIG. 10A illustrates a resistor, inductor, and capacitor structural electronic components of a wireless sensor node, according to certain embodiments. As shown in FIG. 10A, resistor 604*c*, inductor 706*c*, and resistor 802*b* each comprise a nanostructure layer comprising parallel patterned nanostructures 108 embedded in structural polymer matrix 112. Alternatively, FIG. 10B shows a non-limiting embodiment of a structural electronics wireless sensor node comprising an inductor and a capacitor. As shown in FIG. 10B, structural electronics wireless sensor node 150*f* comprises inductor 706*d* and capacitor 802*c*. In some such embodiments, the inductor and capacitor may have an intrinsic resistance (e.g., parasitic resistance), which causes the inductor to function as both an inductor and a resistor.

According to certain embodiments, a structural electronics resistor is provided. In some embodiments, the resistor is a structural electronics component that comprises a nanostructure layer comprising a plurality of patterned nanostructures embedded in an electrically insulating matrix. In certain aspects, the resistor may be positioned within a larger circuit or system to serve any of a variety of suitable purposes. For example, in some embodiments, the resistor may be used to provide a resistance, and its behavior may not be monitored. In some embodiments, the resistor may be used as a sensor, with the resistance being monitored to assess a condition of interest, such as an environment condition.

The resistor described herein may have any of a variety of suitable resistances values. For example, in certain embodiments the resistor has a resistance of greater than or equal to 1 megaohm (Mohm), greater than or equal to 25 Mohms, greater than or equal to 50 Mohms, greater than or equal to 75 Mohms, greater than or equal to 100 Mohms, greater than or equal to 125 Mohms, greater than or equal to 150 Mohms, greater than or equal to 175 Mohms, greater than or equal to 200 Mohms, greater than or equal to 225 Mohms, or greater than or equal to 250 Mohms. In some embodiments, the resistor has a resistance of less than or equal to 300 Mohms, less than or equal to 250 Mohms, less than or equal to 225 Mohms, less than or equal to 200 Mohms, less than or equal to 175 Mohms, less than or equal to 150 Mohms, less than or equal to 125 Mohms, less than or equal to 100 Mohms, less than or equal to 75 Mohms, less than or equal to 50 Mohms, or less than or equal to 25 Mohms. Combinations of the above recited ranges are also possible (e.g., the resistor has a resistance of greater than or equal to 1 Mohm and less than or equal to 300 Mohms, the resistor has a resistance of greater than or equal to 50 Mohms and less than or equal to 75 Mohms, etc.).

Figure 6:
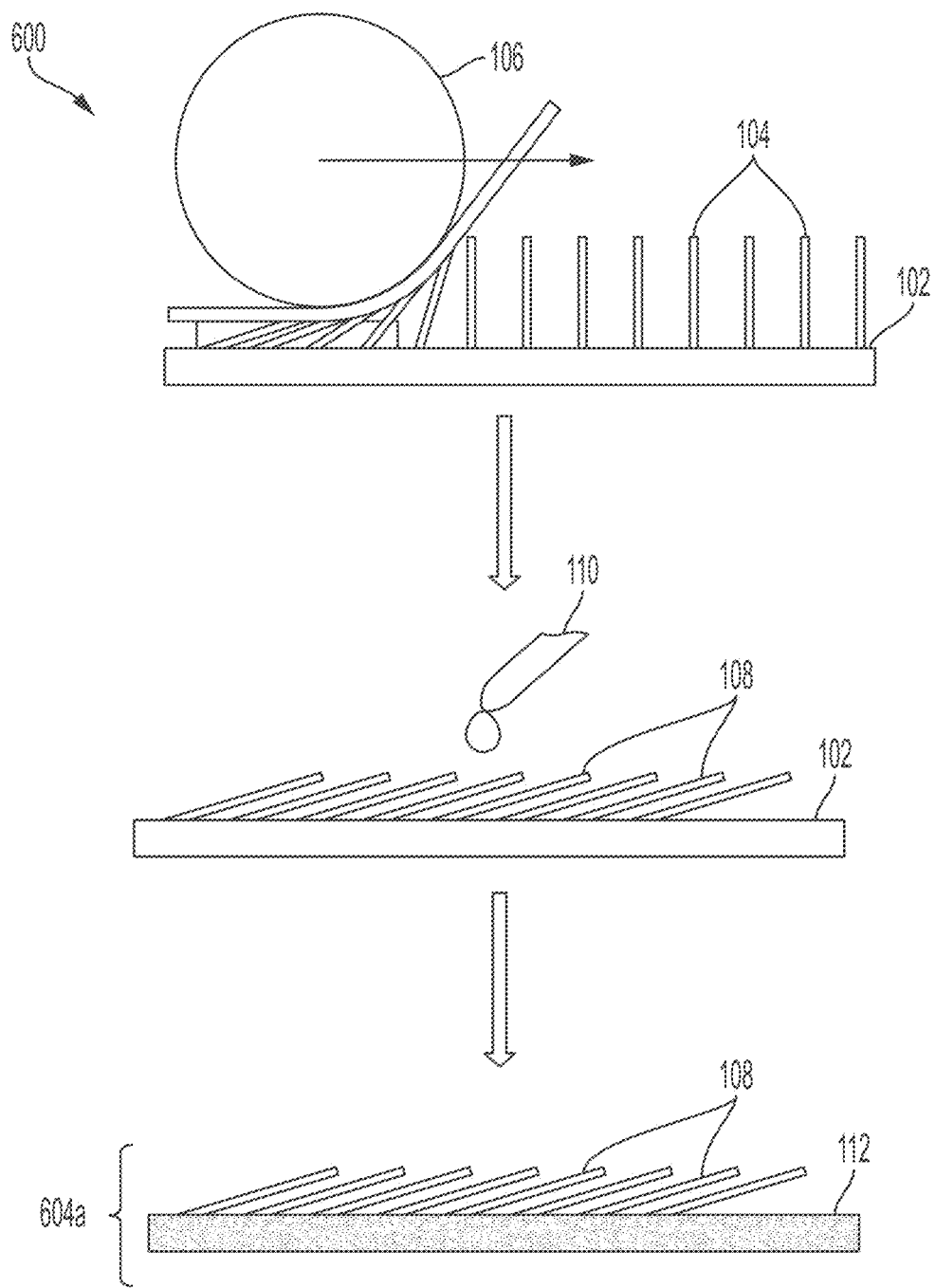
FIG. 6 illustrates a non-limiting method of fabricating a resistor, according to certain embodiments.
Figure 7:
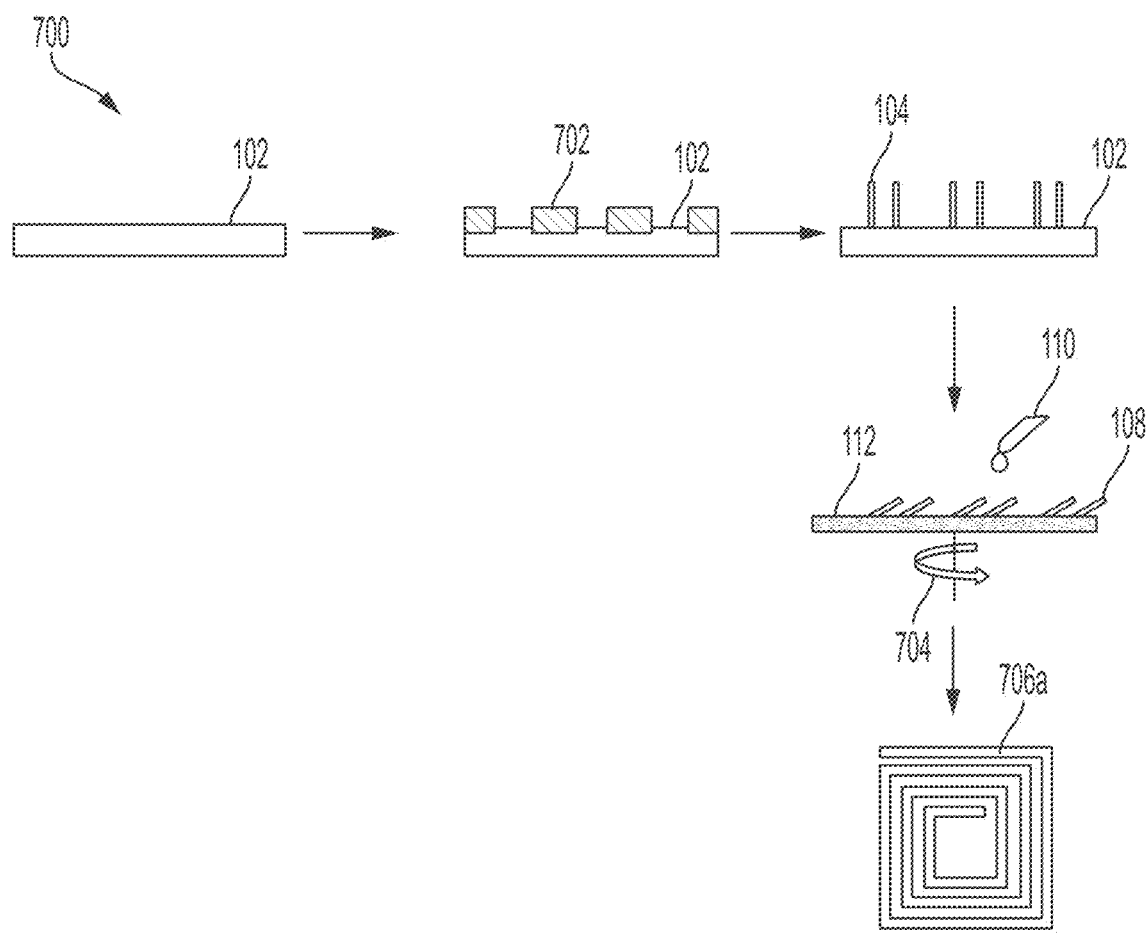
FIG. 7 illustrates a non-limiting method of fabricating an inductor, according to some embodiments.

The resistor may be fabricated by any of a variety of suitable techniques. For example, in some embodiments, a substrate may be provided, and a forest of vertically aligned patterned nanostructures are grown on the substrate. In some aspects, the forest of parallel patterned nanostructures may be knocked own (e.g., with a roller, with solvent, etc.), thereby providing a forest of parallel patterned nanostructures on the substrate. In certain embodiments, an electrically conductive material (e.g., a polymer) may then be drop casted onto the forest of parallel patterned nanostructures on the substrate, thereby providing parallel patterned nanostructures embedded in a substrate. In some aspects, the electrically conductive material may be spin-coated, cured, and/or delaminated, in order to provide the resistor. Without wishing to be bound by theory, any combination of the fabrication methods described herein, with respect to a nanostructure layer, may be used in fabricating the resistor. FIG. 6 illustrates a non-limiting method of fabricating a resistor, according to certain embodiments. In some aspects, as shown in FIG. 6, method of fabricating resistor 600 comprises knocking down forest of parallel patterned nanostructures 104 on substrate 102 using roller, thereby providing forest of parallel patterned nanostructures 108 on substrate 102. In some embodiments, electrically insulating material 110 (e.g., structural polymer material) may be drop casted onto forest of parallel patterned nanostructures 108 on substrate 102, resulting in resistor 604a comprising a parallel patterned nanostructures 108 embedded in structural polymer matrix 112.

As described herein, certain embodiments are related to a structural electronics inductor. In some embodiments, the inductor is a structural electronics component that comprises a nanostructure layer comprising a plurality of patterned nanostructures embedded in an electrically insulating matrix. The inductor may be positioned within a larger circuit or system to serve any of a variety of suitable purposes. For example, the inductor may be used to provide an electromagnetic inductance, and its behavior may not be monitored. According to certain embodiments, the inductor may be used as a sensor, with the electromagnetic inductance being monitored to assess a condition of interest, such as an environment condition. In some embodiments, the inductor is used to store the current of the structural electronics wireless sensor node.

The inductor may have any of a variety of suitable inductance values. For example, in certain embodiments the inductor has an inductance of greater than or equal to 1 nanohenrys (nH), greater than or equal to 5 nH, greater than or equal to 10 nH, greater than or equal to 15 nH, greater than or equal to 20 nH, greater than or equal to 50 nH, or greater than or equal to 100 nH. In some embodiments, the inductor has an inductance of less than or equal to 200 nH, less than or equal to 100 nH less than or equal to 50 nH, less than or equal to 20 nH, less than or equal to 15 nH, less than or equal to 10 nH, or less than or equal to 5 nH. Combinations of the above recited ranges are also possible (e.g., the inductor has an inductance of greater than or equal to 1 nH and less than or equal to 200 nH, the inductor has an inductance of greater than or equal to 15 nH and less than or equal to 50 nH, etc.).

Figure 8:
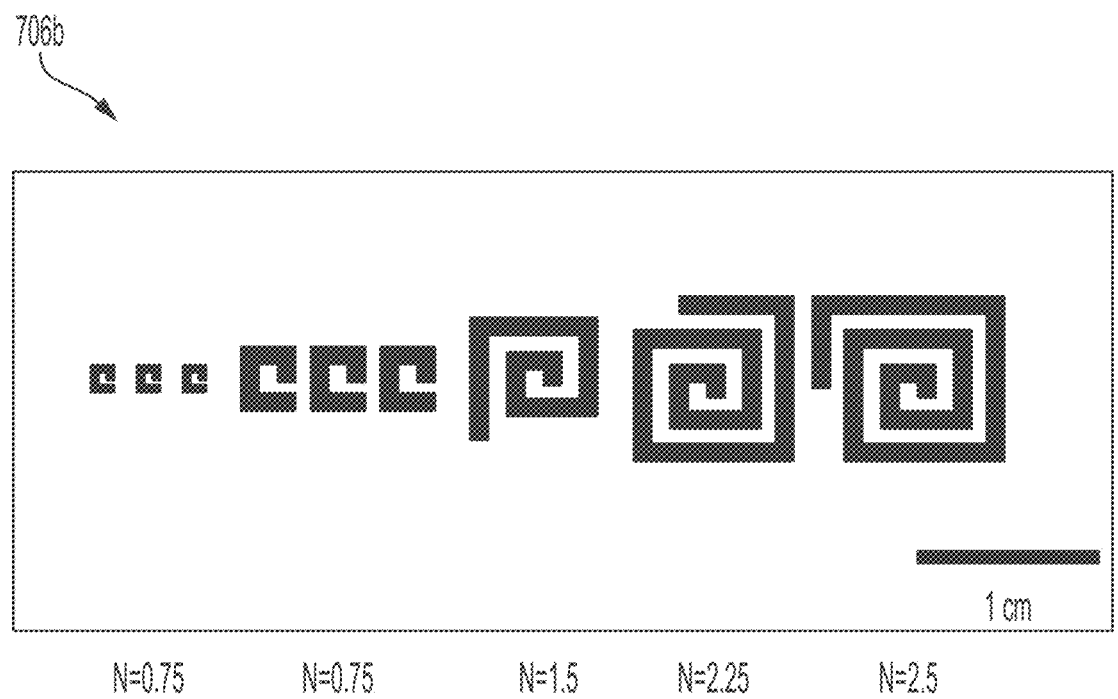
FIG. 8 illustrates a series of fabricated inductors, according to certain embodiments.

The inductor may be fabricated by any of a variety of suitable techniques. For example, according to some embodiments, the inductor may be fabricated by providing a substrate and growing a forest of vertically aligned patterned nanostructures on the substrate. In certain embodiments, the nanostructures may be grown using lithography to mask a particular pattern on the substrate with an active growth material. In certain embodiments, the forest of vertically aligned patterned nanostructures can then be knocked down using the methods described herein. In certain embodiments, an electrically conductive material (e.g., a polymer) may then be drop casted onto the forest of parallel patterned nanostructures on the substrate, thereby providing parallel patterned nanostructures embedded in the substrate. In some embodiments, the parallel patterned nanostructures embedded in the substrate may be drop-casted, spin-coated, cured, and/or delaminated, in order to provide the inductor. Without wishing to be bound by theory, any combination of the fabrication methods described herein, with respect to a nanostructure layer, may be used in fabricating the inductor. FIG. 4 illustrates a non-limiting method of fabricating an inductor, according to some embodiments. In certain embodiments, substrate 102 is provided, and patterned with active growth material 702 (e.g, using lithography masking techniques). According to some embodiments, a forest of vertically aligned patterned nanostructures 104 are grown on substrate 102, followed by knocking down the forest of vertically aligned patterned nanostructures, drop-casting electrically insulating material 110, and spin-coating 118, thereby providing inductor 706 comprising forest of parallel patterned nanostructures 108 embedded in structural polymer matrix 112. FIG. 8 illustrates a series of fabricated inductors, according to certain embodiments, ranging in pattern and size.

Certain embodiments are related to a structural electronics capacitor. In some embodiments, the capacitor is a structural electronics element that comprises a nanostructure layer comprising a plurality of patterned nanostructures embedded in an electrically insulating matrix. The capacitor may be positioned within a larger circuit or system to serve any of a variety of suitable purposes. For example, according to certain embodiments, the capacitor is configured to measure a capacitance, and its behavior may not be monitored. In certain embodiments, the capacitor may be used as a sensor, with the capacitance being monitored to assess a condition of interest, such as an environment condition. In some embodiments, the inductor is used to store a charge of the structural electronics wireless sensor node.

The capacitor may have any of a variety of suitable capacitance values. For example, in certain embodiments the capacitor has a capacitance of greater than 0 picofarads (pF), greater than or equal to 1 pF, greater than or equal to 2 pF, greater than or equal to 4 pF, greater than or equal to 6 pF, greater than or equal to 8 pF, greater than or equal to 10 pF, or greater than or equal to 12 pF. In some embodiments, the capacitor has a capacitance of less than or equal to 15 pF, less than or equal to 12 pF, less than or equal to 10 pF, less than or equal to 8 pF, less than or equal to 6 pF, less than or equal to 4 pF, less than or equal to 2 pF, or less than or equal to 1 pF. Combinations of the above recited ranges are also possible (e.g., the capacitor has a capacitance of greater than 0 pF and less than or equal to 12 pF, the capacitor has a capacitance of greater than 4 pF and less than or equal to 10 pF, etc.).

Figure 9:
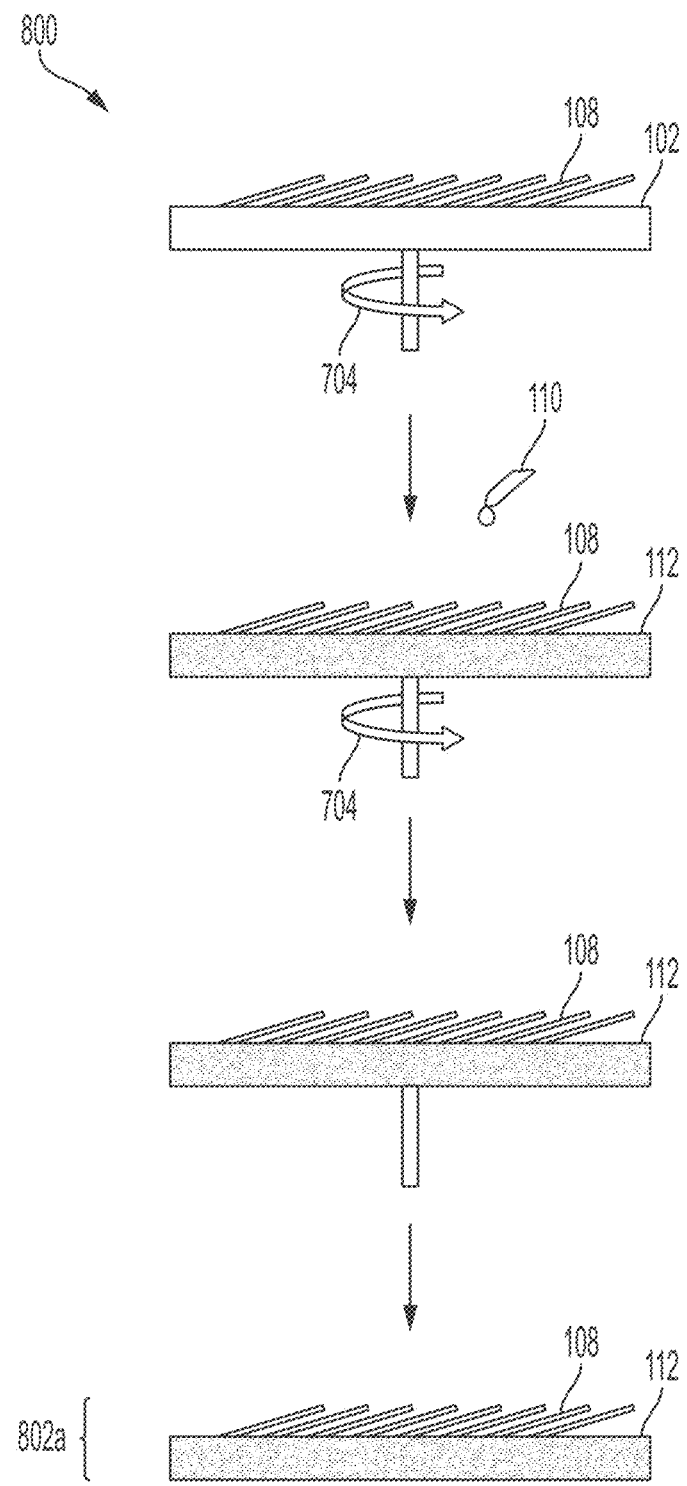
FIG. 9 illustrates a non-limiting method of fabricating a capacitor, according to some embodiments.

The capacitor may be fabricated by any of a variety of suitable techniques. For example, in some embodiments, a substrate is provided, and a forest of vertically aligned patterned nanostructures are grown on the substrate. In some aspects, the forest of parallel patterned nanostructures may be knocked down, thereby providing a forest of parallel patterned nanostructures on the substrate. In certain embodiments, an electrically conductive material (e.g., a polymer) may then be drop casted onto the forest of parallel patterned nanostructures on the substrate, thereby providing parallel patterned nanostructures embedded in a substrate. In some aspects, the parallel patterned nanostructures embedded in a substrate may be spin-coated, cured, and/or delaminated, in order to provide the capacitor. Without wishing to be bound by theory, any combination of the fabrication methods described herein, with respect to a nanostructure layer, may be used in fabricating the capacitor. FIG. 9 illustrates a non-limiting method of fabricating a capacitor, according to some embodiments. In certain embodiments, forest of parallel patterned nanostructures 108 on a substrate 102 are subjected to two iterations of drop casting an electrically insulating material 110 and spin-coating 118, thereby providing parallel patterned nanostructures embedded in an electrically insulating matrix. In certain embodiments, parallel patterned nanostructures embedded in an electrically insulating matrix are then cured, thereby providing capacitor 802a.

Certain embodiments described herein relate to an antenna (e.g., a flexible patch antenna). In some embodiments, the antenna is a structural electronics element that comprises a nanostructure layer comprising a plurality of patterned nanostructures embedded in an electrically insulating matrix.

According to certain embodiments, the flexible patch antenna may be configured to flex. FIG. 13A illustrates a perspective view of a flexible patch antenna, according to certain embodiments. While FIG. 13A illustrates a flexible patch antenna being flexed in a single direction, it should be appreciated that the flexible patch antenna may be flexed in any suitable direction. In some embodiments, flexible patch antenna 950a comprises a plurality of parallel patterned nanostructures 108 embedded in a structural polymer matrix 112. In some embodiments, the flexible patch antenna is configured to harvest energy (e.g., radiofrequency energy). In certain embodiments, the flexible patch antenna is configured to route the energy captured to a desired destination (e.g., a second nanostructure layer of a wireless sensor node that serves an additional electronic function other than the antenna).

Some embodiments relate to a method of fabricating a flexible patch antenna. For example, in some embodiments, a forest of vertically aligned patterned nanostructures are grown on a substrate. In some embodiments, the forest of vertically aligned patterned nanostructures are knocked down using any of a variety of suitable methods described herein (e.g., with a roller, with a solvent), thereby providing a forest of parallel patterned nanostructures on the substrate. According to certain embodiments, an electrically insulating material (e.g. dielectric polymer, EPON) added to the forest of parallel patterned nanostructures on the substrate by any of a variety of suitable methods (e.g., drop casting), thereby providing parallel patterned nanostructures embedded in a structural polymer matrix is provided. According to certain embodiments, the flexible patch antenna may be protected with a layer of polymeric adhesive, such as polyethylene terephthalate (PET). Without wishing to be bound by theory, any combination of the fabrication methods described herein, with respect to a nanostructure layer, may be used in fabricating the antenna. FIG. 12 is a flow chart of a non-limiting method of fabricating a flexible patch antenna, according to certain embodiments. In FIG. 12 and according to certain embodiments, method of fabricating flexible patch antenna 500 comprises step 904 comprising sputtering a solution of nanostructures on a substrate 904. Step 904 of method 900 is followed by step 906, which comprises introducing an electrically insulating material to provide parallel patterned nanostructures embedded in an electrically insulating matrix. Method 900 optionally comprises step 908, comprising protecting the nanostructures embedded in the electrically insulating matrix (e.g., with a polymeric adhesive). FIG. 13B shows a fabricated flexible patch antenna, according to certain embodiments. In certain embodiments, electronic device 952 may be disposed on the backside of the flexible patch antenna 950c. In certain embodiments, a fabricated flexible patch antenna may have a length and/or width of greater than or equal to 0.5 inches, greater than or equal to 1 inch, greater than or equal to 1.5 inches, greater than or equal to 2 inches, and the like.

According to certain non-limiting embodiments, a first electronic component of the structural electronics wireless sensor node is an antenna and a second electronic component of the structural electronics wireless sensor node is an energy harvester. For example, in some aspects, the structural electronics wireless sensor node includes an antenna and a sensor (e.g., a sensing element) that communicate wirelessly by altering an impedance of the antenna. In certain embodiments, the structural wireless sensor node includes an antenna, an energy harvesting device, and an energy storage device. In some embodiments, the energy harvester may harvest energy from carrier signals received at the antenna. For example, the antenna can have a variety of suitable frequency responses for S11 input/output relationships. The antenna may have a frequency response of greater than or equal to 0.5 GHz, greater than or equal to 1.0 GHz, greater than or equal to 1.5 GHz, greater than or equal to 2.0 GHz, or greater than 2.5 GHz. In certain other embodiments, the energy harvester may be a thermoelectric harvester, vibrational harvester, or photovoltaic harvester. In some embodiments, the harvested energy may be stored in an energy storage component formed as a different nanostructure layer of the multi-layer structural electronics wireless sensor node.

According to some embodiments, the energy harvester is a RF far field harvester. According to certain embodiments, RF signals used by the sensor node may include signals such as a 2.4 GHz continuous wave (CW) carrier signal. As such, the antenna may be a 2.4 GHz antenna in some embodiments, although other frequencies may be used. In some embodiments, the antenna is configured for RF far field energy harvesting and backscattering communication by altering its RF impedance.

In some embodiments, the flexible patch antenna is a sensor data link (e.g., a passive sensor data link). In certain aspects, the flexible patch antenna can control and/or alter impedance. As a result, according to certain embodiments, the flexible patch antenna can communicate wirelessly through backscattering communication to other nanostructure layers serving a different electronic function of the wireless sensor node (e.g., a sensing element).

In certain non-limiting embodiments, a first electronic component is a sensing element (e.g., general sensor) and a second electronic component is an antenna. In some aspect, the sensing element is a corrosion sensor and/or crack sensor.

According to some embodiments, the sensing element (e.g., corrosion sensor, crack sensor), energy harvester, and/or antenna are disposed in respective nanostructure layers of the plurality of nanostructure layers of the structural electronics wireless sensor node.

In some embodiments, one or more of the resistor, inductor, and capacitor structural electronics components are necessary to match the impedance between an antenna and a sensor node in order to achieve maximum energy transfer. For example, FIG. 11 illustrates an impedance matching element of a wireless sensor node. In some embodiments, the impedance matching element could be formed using the resistor, inductor, and capacitor structural electronic components. The impedance matching network may be a radio frequency (RF) impedance matching network. The resistor may function as a resistor at radio frequencies. Accordingly, in certain embodiments, it may be particularly useful for the structural wireless sensor node to comprise a resistor, an inductor, a capacitor, and an antenna.

Figure 5D:
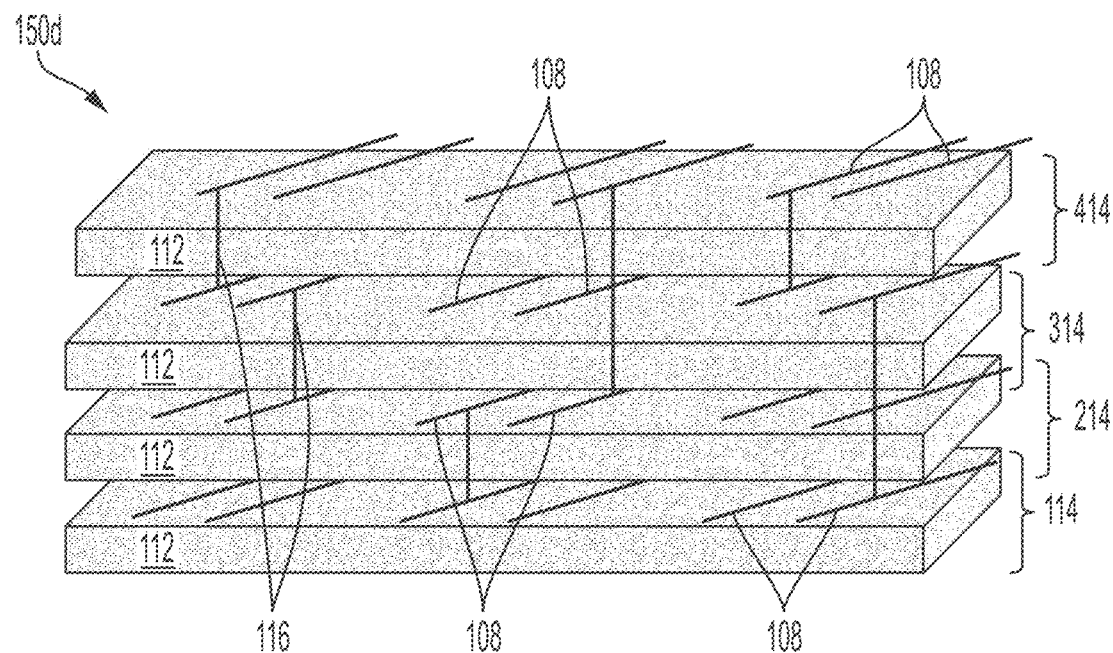
FIG. 5D illustrates a structural wireless sensor node comprising a first nanostructure layer, a second nanostructure layer, a third nanostructure layer, and a fourth nanostructure layer stacked vertically forming a structural electronics wireless sensor node, in accordance with certain embodiments.

In some embodiments, the structural electronics wireless sensor node comprises at least four nanostructures layers. FIG. 5B illustrates a structural wireless sensor node comprising a first nanostructure layer, a second nanostructure layer, a third nanostructure layer, and a fourth nanostructure layer configured in a planar fashion forming a structural electronics wireless sensor node, in accordance with some embodiments, and FIG. 5D illustrates a structural wireless sensor node comprising a first nanostructure layer, a second nanostructure layer, a third nanostructure layer, and a fourth nanostructure layer stacked vertically forming a structural electronics wireless sensor node, in accordance with certain embodiments. As shown in FIG. 5B and FIG. 5D, structural electronics wireless sensor node 150 comprises first nanostructure layer 114, second nanostructure layer 214, third nanostructure layer 314, and fourth nanostructure layer 414, which may correspond to a resistor component, a inductor component, a capacitor component, and an antenna component, respectively.

Figure 5E:
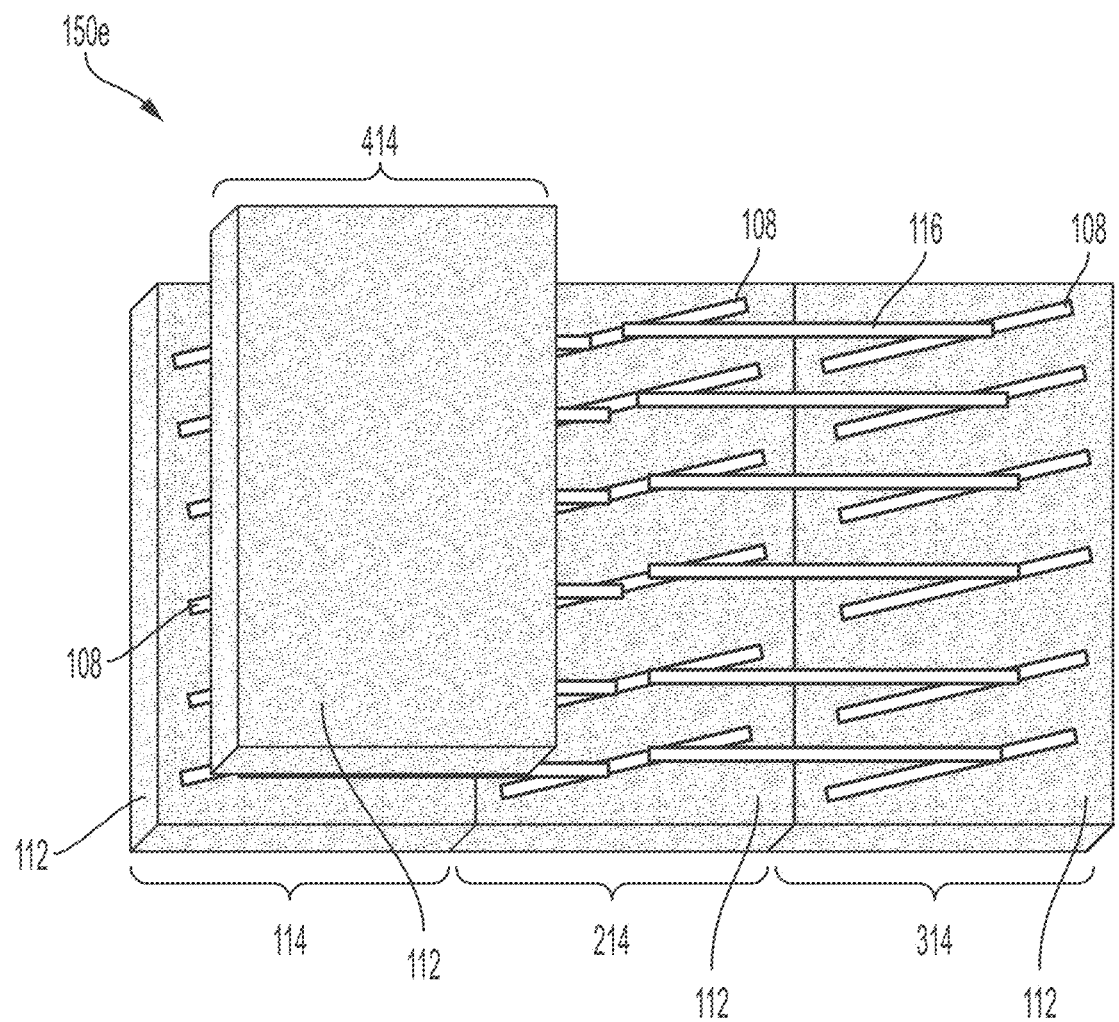
FIG. 5E illustrates a structural wireless sensor node comprising a first nanostructure layer, a second nanostructure layer, a third nanostructure layer, and a fourth nanostructure layer, wherein at least a portion of the nanostructure layers are configured in a planar fashion and at least a portion of the nanostructure layers are stacked vertically, in accordance with certain embodiments.

FIG. 5E illustrates a structural wireless sensor node comprising a first nanostructure layer, a second nanostructure layer, a third nanostructure layer, and a fourth nanostructure layer, wherein at least a portion of the nanostructure layers are configured in a planar fashion and at least a portion of the nanostructure layers are stacked vertically, in accordance with certain embodiments. For example, as shown in FIG. 5E, first nanostructure layer 114, second nanostructure layer 214, and third nanostructure layer 314 are configured in a planar fashion. Fourth nanostructure layer 414, however, is layered on top of first nanostructure layer 114 and second nanostructure layer 214. In certain embodiments, it may be particularly useful to employ such configurations when the structural electronics wireless sensor node comprises a resistor, inductor, capacitor, and antenna. In some such embodiments, the structural electronics wireless sensor node may comprise the RLC components in a planar fashion, with the antenna layered on top of one or more of the RLC components. In certain embodiments, the antenna may be layered on top of the RLC components due to its large surface area (e.g., length and/or width greater than 0.5 inches, greater than 1.0 inches, greater than 1.5 inches, etc.).

Various other types of electronic components and/or configurations of the multi-layer structural electronics wireless sensor node may be employed. For example, in certain embodiments, the structural electronics wireless sensor node may comprise a transistor, such as a field-effect transistor (FET). In some embodiments, the structural electronics wireless sensor node comprises a diode. In certain aspects, the structural electronics wireless sensor node comprises a rectifier. In some embodiments, filters, switches, and/or logic gates may be formed. In some embodiments, the structural electronics wireless sensor node comprises a data link layer formed in a respective nanostructure layer of the plurality of nanostructure layers. According to some embodiments, the structural electronics wireless sensor node comprises a power management module formed in a respective nano structure layer of the plurality of nanostructure layers.

FIG. 14 illustrates an exemplary embodiment of a wireless structural electronic sensor node, according to some embodiments. Referring to FIG. 14, structural electronics wireless sensor node 150g may comprise impedance matching element 962, energy harvester electronic component 964 (e.g., a RF far field harvester), general-purpose input/output component 966, corrosion sensor 968, amplitude-shift keying modulator 970, and/or amplitude-shift keying demodulator 972.

According to certain embodiments, one or more nanostructure layers comprising a plurality of patterned nanostructures embedded in an electrically insulating matrix may be integrated into manufactured products, thereby enabling structural electronics advanced manufacturing. For example, FIG. 15 illustrates the integration of a structural wireless sensor node into a manufactured product. In certain embodiments, the manufactured product is a land system and/or vehicle, a water system and/or vehicle, an air system and/or vehicle, and/or a space system and/or vehicle. As shown in FIG. 15, the manufactured product is an airplane. In certain embodiments, the structural electronics wireless sensor node causes less than 5%, less than 10%, less than 20%, less than 30%, less than 40%, less than 50%, less than 75%, less than 100%, less than 200%, less than 300%, or less than 500% increase in maximum strain throughout the product it is being integrated into.

According to some embodiments, manufacturing products with a structural electronics sensor enables smart maintenance applications to monitor and schedule maintenance cycles based on the structure health of the wireless sensor node, and not just on planned maintenance periods with condition-based monitoring, non-destructive evaluation, structural health monitoring, and/or health usage monitoring system applications.

In certain embodiments, the antenna powered by energy harvesting may be used for any of a variety of applications, including in military, healthcare, and industrial settings. For example, a flexible path antenna may be disposed on a piece of industrial machinery to harvest energy and to power a sensor monitoring operation of the machinery.

According to certain embodiments, the nanostructures have at least one characteristic dimension (e.g., cross-sectional dimension) of less than or equal to 500 nm, less than or equal to 250 nm, less than or equal to 100 nm, less than or equal to 75 nm, less than or equal to 50 nm, less than or equal to 25 nm, less than or equal to 10 nm, or, in some cases, less than or equal to 1 nm. Nanostructures described herein may have, in some cases, a maximum characteristic dimension (e.g., maximum cross-sectional dimension) of less than 1 micrometer, less than or equal to 500 nm, less than or equal to 250 nm, less than or equal to 100 nm, less than or equal to 75 nm, less than or equal to 50 nm, less than or equal to 25 nm, less than or equal to 10 nm, or, in some cases, less than or equal to 1 nm.

In certain embodiments, the nanostructures may be elongated nanostructures with high aspect ratios. For example, in certain embodiments, the nanostructures may have a length of greater than or equal to 0.1 micrometers, greater than or equal to 1 micrometer, greater than or equal to 50 micrometers, greater than or equal to 100 micrometers, greater than or equal to 200 micrometers, greater than or equal to 300 micrometers, or greater than or equal to 400 micrometers.

In some embodiments, the forest of nanostructures comprises at least 5, at least 10, at least 50, at least 100, at least 500, at least 1000, or at least 10,000 nanostructures. In some such embodiments, the forest of nanostructures may comprise at least $10^6$, at least $10^7$, at least $10^8$, at least $10^9$, at least $10^{10}$, at least $10^{11}$, at least $10^{12}$, or at least $10^{13}$ nanostructures. Those of ordinary skill in the art are familiar with suitable methods for forming forests of nanostructures. For example, in some embodiments, the forest of nanostructures can be catalytically grown (e.g., using a growth catalyst deposited via chemical vapor deposition process). In some embodiments, the as-grown forest can be used as is, while in other cases, the as-grown forest may be mechanically manipulated after growth and prior to subsequent processing steps described elsewhere herein (e.g., folding, shearing, compressing, buckling, etc.).

In some cases, CNTs may resemble a sheet of graphite formed into a seamless cylindrical structure. In some cases, CNTs may include a wall that comprises fine-grained $sp^2$ sheets. In certain embodiments, CNTs may have turbostratic walls. It should be understood that the CNT may also comprise rings or lattice structures other than six-membered rings. Typically, at least one end of the CNT may be capped, i.e., with a curved or nonplanar aromatic structure. In some cases, the CNTs may have a diameter of the order of nanometers and a length on the order of millimeters, or, on the order of tenths of micrometers, resulting in an aspect ratio greater than 100, 1000, 10,000, 100,000, $10^6$, $10^7$, $10^8$, $10^9$, or greater. Examples of CNTs include single-walled carbon nanotubes (SWCNTs), double-walled carbon nanotubes (DWCNTs), multi-walled carbon nanotubes (MWCNTs) (e.g., concentric carbon nanotubes), inorganic derivatives thereof, organic derivatives thereof, and the like. In some embodiments, the CNT is a single-walled CNT. In some cases, the CNT is a multi-walled CNT (e.g., a double-walled CNT). In some cases, the CNT comprises a multi-walled or single-walled CNT with an inner diameter wider than is attainable from a traditional catalyst or other active growth material. In some cases, the CNT may have a diameter less than 1 micrometer, less than 500 nm, less than 250 nm, less than 100 nm, less than 50 nm, less than 25 nm, less than 10 nm, or, in some cases, less than 1 nm.

The terms "approximately", "substantially," and "about" may be used to mean within +/−20% of a target value in some embodiments, within +/−10% of a target value in some embodiments, within +/−5% of a target value in some embodiments, and yet within +/−2% of a target value in some embodiments. The terms "approximately" and "about" may include the target value.

The following examples are intended to illustrate certain embodiments of the present technology, but do not exemplify the full scope of the technology.

EXAMPLES

The following examples show data related to the electronic properties of structural electronics wireless sensor nodes.

FIG. 16 shows insertion loss S11 as a function of frequency for a fabricated antenna, according to certain embodiments. As shown in FIG. 16, a fabricated patch antenna has a 1.8 GHz frequency response with an insertion loss S11 of −1 dB, indicating that the flexible patch antenna can harvest energy oscillating at that frequency.

Various CNT-based structural electronics components were fabricated and tested, as now described. A CNT structural electronics resistor was fabricated, of the type illustrated in FIG. 10A as resistor 604c. The electronic properties were determined, as shown in FIGS. 17A-17D. FIG. 17A shows a plot of the resistivity of the structural electronics resistor with CNTs as a function of the CNT length (measured in microns). Three data sets are illustrated, including "perpendicular," "parallel," and "anisotropy." The "perpendicular" data reflects the resistivity of the structural electronics resistor as measured perpendicular to the axis of the CNTs. The "parallel" data represents the resistivity as measured parallel to the CNT axis. The "anisotropy" data represents the anisotropy of the structure. FIG. 17B shows a plot of the sheet resistance of a structural electronics resistor with CNTs as a function of the CNT length (in microns). Data is shown for two different resistors, one being a 300 micron resistor (line 1702) and the other being a 50 micron resistor (line 1704). FIG. 17C shows a plot of the impedance of a structural electronics resistor with CNTs as a function of frequency (in Hz), according to certain embodiments, as measured parallel to the CNT axis. Data is shown for each of four resistor lengths, including 50 microns, 150 micron, 300 microns, and 500 microns. Specifically, line 1704 is the real impedance for a 50 micron resistor, line 1706 is the real impedance for a 300 micron resistor, line 1708 is the real impedance for a 150 micron resistor, and line 1710 is the real impedance for a 500 micron resistor. Line 1712 is the imaginary impedance for a 150 micron resistor, line 1714 is the imaginary impedance for a 500 micron resistor, line 1716 is the imaginary impedance for a 50 micron resistor, and line 1718 is the imaginary impedance for a 300 micron resistor. FIG. 17D shows an alternate plot to that of FIG. 17C, as measured perpendicular to the CNT axis of the structural electronics resistor. Specifically, line 1720 is the real impedance for a 50 micron resistor, line 1722 is the real impedance for a 150 micron resistor, line 1724 is the real impedance for a 300 micron resistor, and line 1726 is the real impedance for a 500 micron resistor. Line 1728 is the imaginary impedance for a 150 micron resistor, line 1730 is the imaginary impedance for a 500 micron resistor, line 1732 is the imaginary impedance for a 300 micron resistor, and line 1734 is the imaginary impedance for a 50 micron resistor.

The piezoresistivity of a structural electronics resistor with CNTs was evaluated. FIG. 18A shows the set-up for testing the piezoresistivity of a structural electronics resistor, according to certain embodiments. The resistor (left image), wiring (center image), and testing apparatus (right) are shown. FIG. 18B shows the piezoresistivity results. Stress of the structural electronics resistor is shown as a function of microstrain, as is dR/R, according to some embodiments. Axial stress and dR/R and transverse stress and dR/R conditions are shown. The dark circles and triangles illustrate axial stress and dR/R, and the white circles and triangles represent transverse stress and dR/R. FIG. 18C shows a plot of the gauge factor of a structural electronics resistor as a function of microstrain for axial conditions (circles) and transverse conditions (triangles), according to certain embodiments.

The properties of a structural electronics capacitor with CNTs was also evaluated. The structural electronics capacitor was of the type shown in FIG. 10B as capacitor 802c. FIG. 19A shows a plot of the impedance of a structural electronics capacitor as a function of frequency, according to some embodiments. FIG. 19B shows the reactance of the structural electronics capacitor as a function of frequency, according to certain embodiments. The capacitor represented in both figures had a spacing of approximately 0.5 mm between interdigitated fingers, represented by "s" in the plots.

The properties of a structural electronics inductor with CNTs was also evaluated. The inductor was of the type shown in FIG. 10A as inductor 706c. FIG. 20A shows a plot of the impedance of a structural electronics inductor as a function of frequency, according to some embodiments. Data for three different inductors of different sizes is shown. $L_o$ represents the length of one side of the outermost loop of the inductor. Data for three values of $L_o$ is shown in the plot. FIG. 20B shows the reactance of the structural electronics inductors for which the impedance is shown in FIG. 20A.

The dynamic mechanical analysis of a polymer nanocomposite with CNTs was evaluated. The samples were tested in a tensile configuration axial and transverse to the nanostructure axis (e.g., CNT alignment). FIG. 21A shows the dynamic mechanical analysis of a polymer nanocomposite with CNTs of length 50 microns, 150 microns, and 500 microns. EPON is also shown. The tensile stress for FIG. 21A is aligned with the CNT axis. In FIG. 21A, line 2102 refers to the storage modulus of a polymer nanocomposite with CNTs of length 50 microns; line 2104 refers to the storage modulus of a polymer nanocomposite with CNTs of length 500 microns; line 2106 refers to the storage modulus of a polymer nanocomposite of length 150 microns; and line 2108 refers to the storage modulus of EPON. Also shown in FIG. 21A, line 2110 refers to the tan delta of a polymer nanocomposite with CNTs of length 50 microns; line 2112 refers to the tan delta of a polymer nanocomposite with CNTs of length 500 microns; line 2114 refers to the tan delta of a polymer nanocomposite of length 150 microns; and line 2116 refers to the tan delta of EPON. FIG. 21B shows the same type of data as FIG. 21A, but for the situation in which the tensile stress is perpendicular to the CNT axis. FIG. 21C shows the dynamic mechanical analysis of a polymer nanocomposite with CNTs as a function of CNT length, according to some embodiments.

The capacitance and inductance of a structural electronics capacitor and inductor, respectively, were evaluated. FIG. 22A shows a plot of the capacitance of a structural electronics capacitor as a function of frequency. FIG. 22B shows a plot of the inductance of a structural electronics inductor as a function of frequency.

What is claimed:

1. A multi-layer structural material, comprising:
a first layer of composite material comprising an insulating matrix and a first plurality of elongated carbon nanotubes (CNTs) embedded in the insulating matrix, wherein the first plurality of elongated CNTs form a first circuit component;
a second layer of composite material stacked on top of the first layer of composite material and comprising an insulating matrix and a second plurality of elongated CNTs embedded in the insulating matrix, wherein the second plurality of elongated CNTs form a second circuit component; and
a third plurality of elongated CNTs penetrating into the first layer and the second layer and electrically coupling the first circuit component and the second circuit component,
wherein the first, second, and third pluralities of CNTs in combination form a structural sensor.

2. The multi-layer structural material of claim 1, wherein the structural sensor is configured to determine whether a mechanical transformation has occurred in the multi-layer structural material; determine a type of mechanical transformation that has occurred in the multi-layer structural material; determine whether a defect is present within the multi-layer structural material; and/or determine a type of defect that is present within the multi-layer structural material.

3. The multi-layer structural material of claim 1, wherein the multi-layer structural material is a laminated material.

4. The multi-layer structural material of claim 1, wherein longitudinal axes of the third plurality of elongated CNTs penetrate the first layer and the second layer.

5. The multi-layer structural material of claim 1, wherein the third plurality of elongated CNTs reinforce an interface between the first layer and the second layer.

6. The multi-layer structural material of claim 5, wherein longitudinal axes of the third plurality of elongated CNTs penetrate the first layer and the second layer.

7. A structural material, comprising:
a first layer of composite material comprising a first plurality of carbon nanotubes (CNTs) embedded in a first insulating matrix, wherein the first plurality of CNTs form a first circuit component;
a second layer of composite material stacked on top of the first layer of composite material and comprising a second plurality of CNTs embedded in a second insulating matrix, wherein the second plurality of CNTs form a second circuit component; and
a third plurality of CNTs disposed partially in the first layer and the second layer and electrically coupling the first circuit component and the second circuit component,
wherein the first layer, the second layer, and the third plurality of CNTs in combination form at least part of a structural sensor.

8. The structural material of claim 7, wherein the structural sensor is configured to determine whether a mechanical transformation has occurred in the structural material; determine a type of mechanical transformation that has occurred in the structural material; determine whether a defect is present within the structural material; and/or determine a type of defect that is present within the structural material.

9. The structural material of claim 7, wherein the structural material is a laminated material.

10. The structural material of claim 7, wherein longitudinal axes of the third plurality of CNTs penetrate the first layer and the second layer.

11. The structural material of claim 7, wherein the third plurality of CNTs reinforce an interface between the first layer and the second layer.

* * * * *